US010260726B2

(12) United States Patent
Wang

(10) Patent No.: US 10,260,726 B2
(45) Date of Patent: Apr. 16, 2019

(54) VEHICLE LAMP DEVICE

(71) Applicant: CHIAN YIH OPTOTECH CO., LTD., Mial-Li Hsien (TW)

(72) Inventor: Cheng Wang, Taipei (TW)

(73) Assignee: CHIAN YIH OPTOTECH CO., LTD., Mial-Li Hsien (TW)

( * ) Notice: Subject to any disclaimer, the term of this patent is extended or adjusted under 35 U.S.C. 154(b) by 0 days.

(21) Appl. No.: 15/890,907

(22) Filed: Feb. 7, 2018

(65) Prior Publication Data

US 2018/0224112 A1 Aug. 9, 2018

(30) Foreign Application Priority Data

Feb. 8, 2017 (TW) .............................. 106104137 A

(51) Int. Cl.
*F21V 29/67* (2015.01)
*B60Q 1/14* (2006.01)
(Continued)

(52) U.S. Cl.
CPC .......... *F21V 29/673* (2015.01); *B60Q 1/0058* (2013.01); *B60Q 1/14* (2013.01); *F21S 41/147* (2018.01); *F21S 41/148* (2018.01); *F21S 41/151* (2018.01); *F21S 41/153* (2018.01); *F21S 41/17* (2018.01); *F21S 41/192* (2018.01); *F21S 41/255* (2018.01); *F21S 41/29* (2018.01); *F21S 41/321* (2018.01); *F21S 41/365* (2018.01); *F21S 41/39* (2018.01); *F21S 41/40* (2018.01); *F21S 41/43* (2018.01); *F21S 41/663* (2018.01); *F21S 41/689* (2018.01); *F21S 43/30* (2018.01); *F21S 45/435* (2018.01);
(Continued)

(58) Field of Classification Search
CPC ...... F21V 29/673; F21V 29/677; F21V 29/74; F21S 41/147; F21S 43/30; F21S 41/17; F21S 41/45; F21S 41/60; F21S 41/43
USPC ....... 362/538, 539, 547, 507, 517, 543, 544, 362/545
See application file for complete search history.

(56) References Cited

U.S. PATENT DOCUMENTS 7,690,818 B2 * 4/2010 Takada ..................... B60Q 1/12
362/299
7,726,858 B2 * 6/2010 Sato ........................ F21S 41/43
362/538
(Continued)

FOREIGN PATENT DOCUMENTS

EP 2 488 785 * 5/2016

OTHER PUBLICATIONS

Machine translation of EP 2488785, Aug. 6, 2018, pp. 1-8.*

*Primary Examiner* — Laura Tso
(74) *Attorney, Agent, or Firm* — Li & Cai Intellectual Property (USA) Office

(57) ABSTRACT

A vehicle lamp is provided. The vehicle lamp includes a base, a first reflection structure, a second reflection structure, a first light emitting structure, a second light emitting structure, and a lens structure. The first reflection structure and second reflection structure are disposed on the base. The first reflection structure includes at least one first focal point and at least one second focal point. The second reflection structure includes a first focal point and a second focal point. The first light emitting structure and the second light emitting structure are disposed on the base. The lens structure includes a lens optical axis and a lens focal point.

19 Claims, 32 Drawing Sheets

(51) Int. Cl.

| | |
|---|---|
| *F21S 41/147* | (2018.01) |
| *F21S 41/17* | (2018.01) |
| *F21S 41/43* | (2018.01) |
| *F21V 29/74* | (2015.01) |
| *F21S 43/30* | (2018.01) |
| *B60Q 1/00* | (2006.01) |
| *F21S 41/19* | (2018.01) |
| *F21S 41/29* | (2018.01) |
| *F21S 41/255* | (2018.01) |
| *F21S 41/39* | (2018.01) |
| *F21S 41/32* | (2018.01) |
| *F21S 41/40* | (2018.01) |
| *F21S 41/663* | (2018.01) |
| *F21S 41/689* | (2018.01) |
| *F21S 45/435* | (2018.01) |
| *F21S 41/153* | (2018.01) |
| *F21S 41/365* | (2018.01) |
| *F21S 41/148* | (2018.01) |
| *F21S 41/151* | (2018.01) |
| *F21S 45/60* | (2018.01) |
| *F21W 102/13* | (2018.01) |

(52) U.S. Cl.
CPC ............ *F21V 29/677* (2015.01); *F21V 29/74* (2015.01); *F21S 45/60* (2018.01); *F21W 2102/13* (2018.01)

(56) References Cited

U.S. PATENT DOCUMENTS

| | | | |
|---|---|---|---|
| 7,993,043 B2 * | 8/2011 | Sazuka | B60Q 1/14 362/509 |
| 8,132,947 B2 * | 3/2012 | Shih | B60Q 1/0041 362/547 |
| 8,162,507 B2 * | 4/2012 | Inaba | F21S 41/147 362/243 |
| 2008/0062709 A1 * | 3/2008 | Mochizuki | B60Q 1/0041 362/539 |
| 2015/0219301 A1 * | 8/2015 | Honda | F21S 48/145 362/517 |

* cited by examiner

VEHICLE LAMP DEVICE

FIELD OF THE INVENTION

The present disclosure relates to a vehicle lamp, and in particular to a vehicle lamp having the function of switching between high and low beam modes of operation.

BACKGROUND OF THE INVENTION

In the conventional design of the vehicle lamp, the demand and regulation for high beam and low beam are different. High beam requires concentrated light to achieve the purpose of long-distance illumination, but low beam requires diffused light to provide a wide viewing field in the close range. Accordingly, the designs of high beam and low beam are usually separated in the concept for designing the vehicle lamp. That is to say, each of high beam and low beam has specially adapted lamp cup. For instance, Taiwan Patent Publication No. M353845 discloses an headlight structure for driving illumination, in which the automobile light structure has the function of switching between high and low beam modes by individually independent high and low beam modules.

Generally, light emitting modules of the conventional vehicle lamp can be classified into halogen lamp and high intensity discharge (HID) lamp. The arc lengths of halogen lamp and HID lamp are about 5.6 mm and about 4.3 mm, respectively; and the projector ellipsoid system (PES) is usually selected to be the light converging system. Since the major light emitting type of HID lamp is focus on two electrodes, the light of high beam can be distributed from the position nearing the light point with high light intensity, and the light of low beam can be distributed from the position far away from the arc with strong light intensity. However, the headlamp with the combined system of high and low beam is difficult to be designed under the single lens structure because that the light emitting type of light-emitting diode (LED) is uniform surface light source without high light intensity area. If the combined system of high and low beam is designed under the conventional single lens structure, the overall vehicle lamp will have large volume and the light emission intensity of the vehicle lamp will reach at most the threshold value of the correlated rule.

As a result, there is an important issue to overcome the aforementioned defects for a person of ordinary skill in the art, by performing a switchable function of high and low beams under LED light source and the single lens structure.

SUMMARY OF THE INVENTION

With regard to overcoming the deficiency of the conventional technology, a vehicle lamp of the present disclosure is provided for increasing the concentration of light and reducing the overall volume of the vehicle lamp.

Therefore, in order to solve the aforementioned problems, an embodiment of the present disclosure is to provide a vehicle lamp including a base, a first reflection structure, a second reflection structure, a first light emitting structure, a second light emitting structure, and a lens structure. The base has a first carrier surface and a second carrier surface. The first reflection structure is disposed on the base and includes at least one first focal point and at least one second focal point corresponding to the at least one first focal point of the first reflection structure. The second reflection structure is disposed on the base and includes a first focal point and a second focal point corresponding to the first focal point of the second reflection structure. The second focal point of the second reflection structure and the second focal point of the first reflection structure are disposed corresponding to each other. The first light emitting structure is disposed on the first carrier surface of the base and corresponds to the at least one first focal point of the first reflection structure. The second light emitting structure disposed on the second carrier surface of the base and corresponds to the first focal point of the second reflection structure. The lens structure has a lens optical axis and a lens focal point located on the lens optical axis. The at least one second focal point of the first reflection structure and the second focal point of the second reflection structure are located on the lens optical axis or adjacent to the lens optical axis. More particularly, both of the first carrier surface and the second carrier surface face toward an upward direction above a horizontal plane.

Another embodiment of the present disclosure provides a vehicle lamp, which includes a reflection structure, a light emitting structure, and a lens structure. The reflection structure has a first reflection surface and a second reflection surface connecting with the first reflection surface. The first reflection surface has a first optical axis and a second optical axis, and the second reflection surface has an optical axis. The light emitting structure has a first light emitting element and a second light emitting structure. The first optical axis passes through the first light emitting element, the second optical axis passes through the second light emitting element, and the optical axis of the second reflection surface is located between the first light emitting element and the second light emitting element. The lens structure has a lens optical axis and a lens focal point located on the lens optical axis. More particularly, the first reflection surface of the first reflection structure has two first focal points separated from each other and two second focal points corresponding respectively to the two first focal points, the first light emitting element is disposed on one of the first focal points, the second light emitting element is disposed on the other first focal point, the two second focal points are overlapped with each other, and the lens optical axis passes through the two second focal points of the first reflection surface of the first reflection structure.

Another embodiment of the present disclosure provides a vehicle lamp, which includes a base, a first reflection structure, a second reflection structure, a first light emitting structure, a second light emitting structure, a lens structure, and a fan structure. The base has a first carrier surface, a second carrier surface, a first heat dissipation surface corresponding to the first carrier surface, a second heat dissipation surface corresponding to the second carrier surface, and an outer side surface connecting the first heat dissipation surface and the second heat dissipation surface. The first carrier surface and the second carrier surface are disposed on different planes, and both of the first carrier surface and the second carrier surface face toward a predetermined direction. The first reflection structure is disposed on the base and includes at least one first focal point and at least one second focal point corresponding to the at least one first focal point of the first reflection structure. The second reflection structure is disposed on the base and includes a first focal point and a second focal point corresponding to the first focal point of the second reflection structure. The second focal point of the second reflection structure and the second focal point of the first reflection structure are disposed corresponding to each other. The first light emitting structure is disposed on the first carrier surface and corresponds to the at least one first focal point of the first reflection structure.

The second light emitting structure is disposed on the second carrier surface of the base and corresponds to the first focal point of the second reflection structure. The lens structure has a lens optical axis and a lens focal point located on the lens optical axis. The at least one second focal point of the first reflection structure and the second focal point of the second reflection structure are located on the lens optical axis or adjacent to the lens optical axis. The fan structure is disposed on the base. More particularly, the fan structure generates a first airflow blowing to the second heat dissipation surface, the first airflow flows along the second heat dissipation surface and reaches the outer side surface to generate a second airflow, the second airflow flows along the outer side surface and blows to the first heat dissipation surface to generate a third airflow, and the third airflow flows along the first heat dissipation surface and blows toward outside the first heat dissipation surface.

Therefore, the overall volume of the vehicle lamp can be reduced and the efficiency of light concentration can be increased by matching the feature of "both of the first carrier surface and the second carrier surface face toward an upward direction above a horizontal plane" of the vehicle lamp of the present disclosure.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a vehicle lamp according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

It should be understood that the definite articles like "the first", "the second" or "the third" may be used to describe various components or signals, but these components or signals should not be limited to definite articles. These definite articles are used for distinguish one component from the other component or one signal from the other signal. Besides, the phrase "or" shown in the present disclosure should be interpreted as anyone item listed in the correlated items or the combination of multiple items listed in the correlated items according to the actual conditions.

[First Embodiment]

Figure 6:
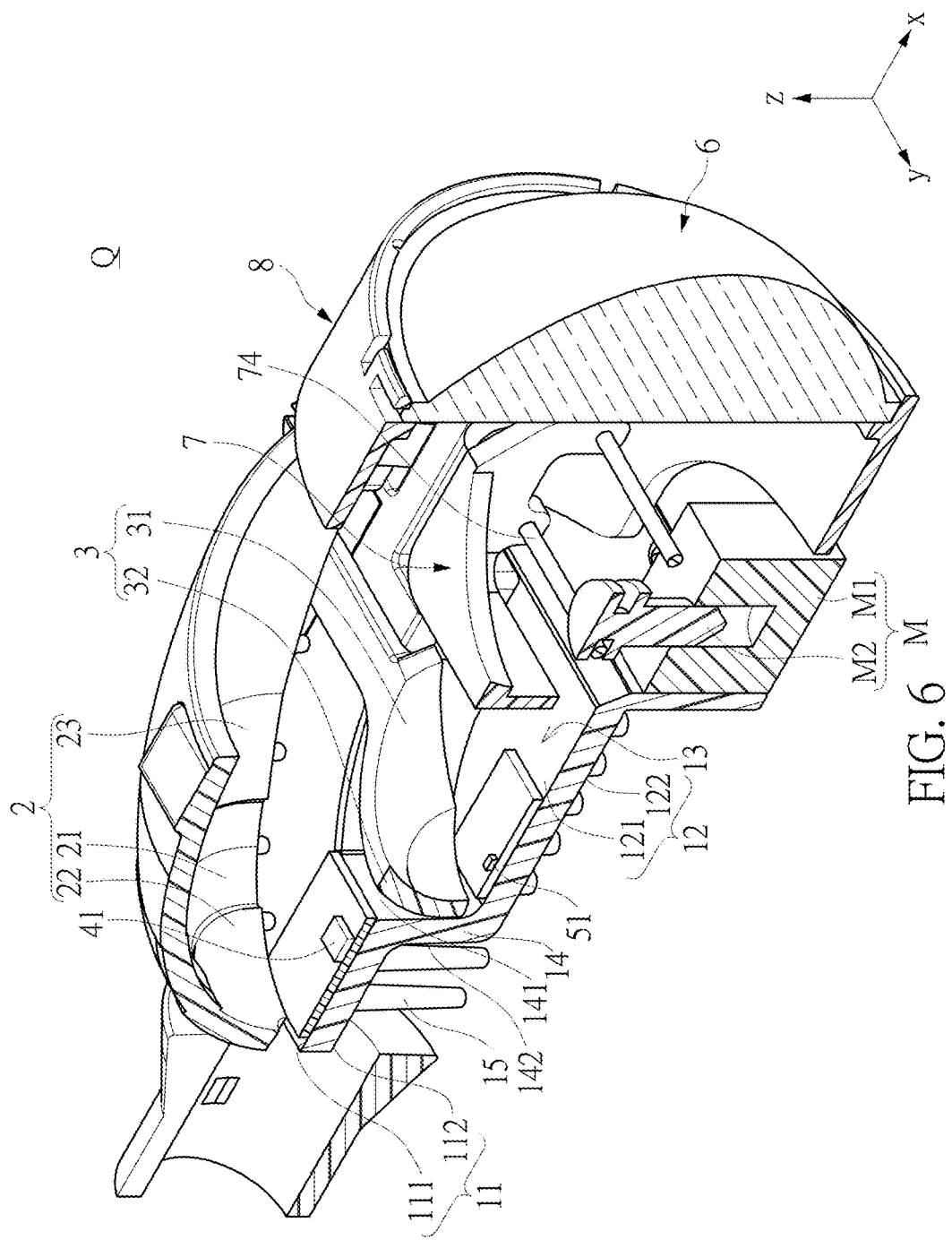
FIG. 6 is a cross-sectional view along the section line VIII-VIII in FIG. 1.
Figure 8:
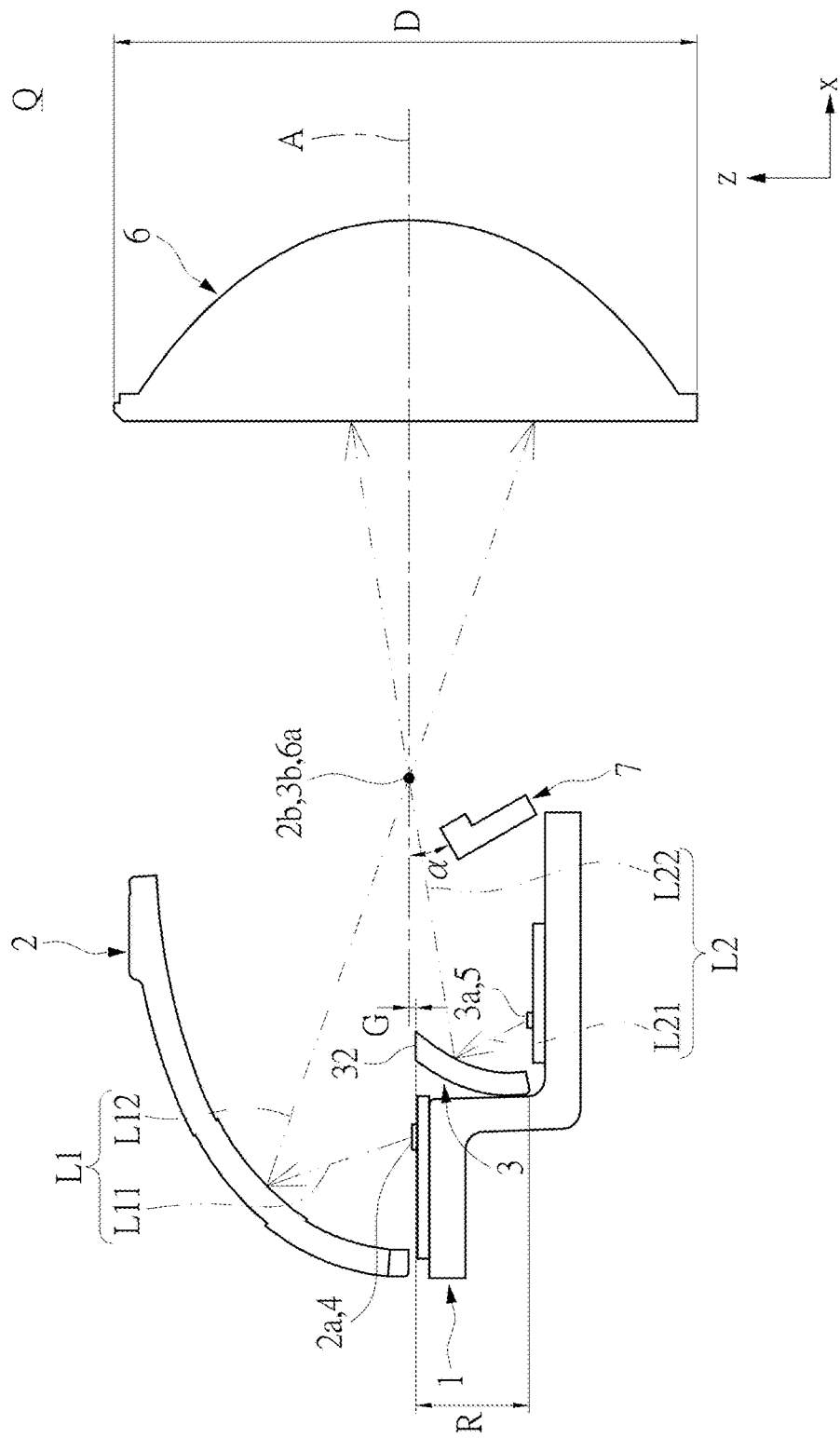
FIG. 8 is a side sectional view taken along the section line VIII-VIII in FIG. 1.
Figure 11:
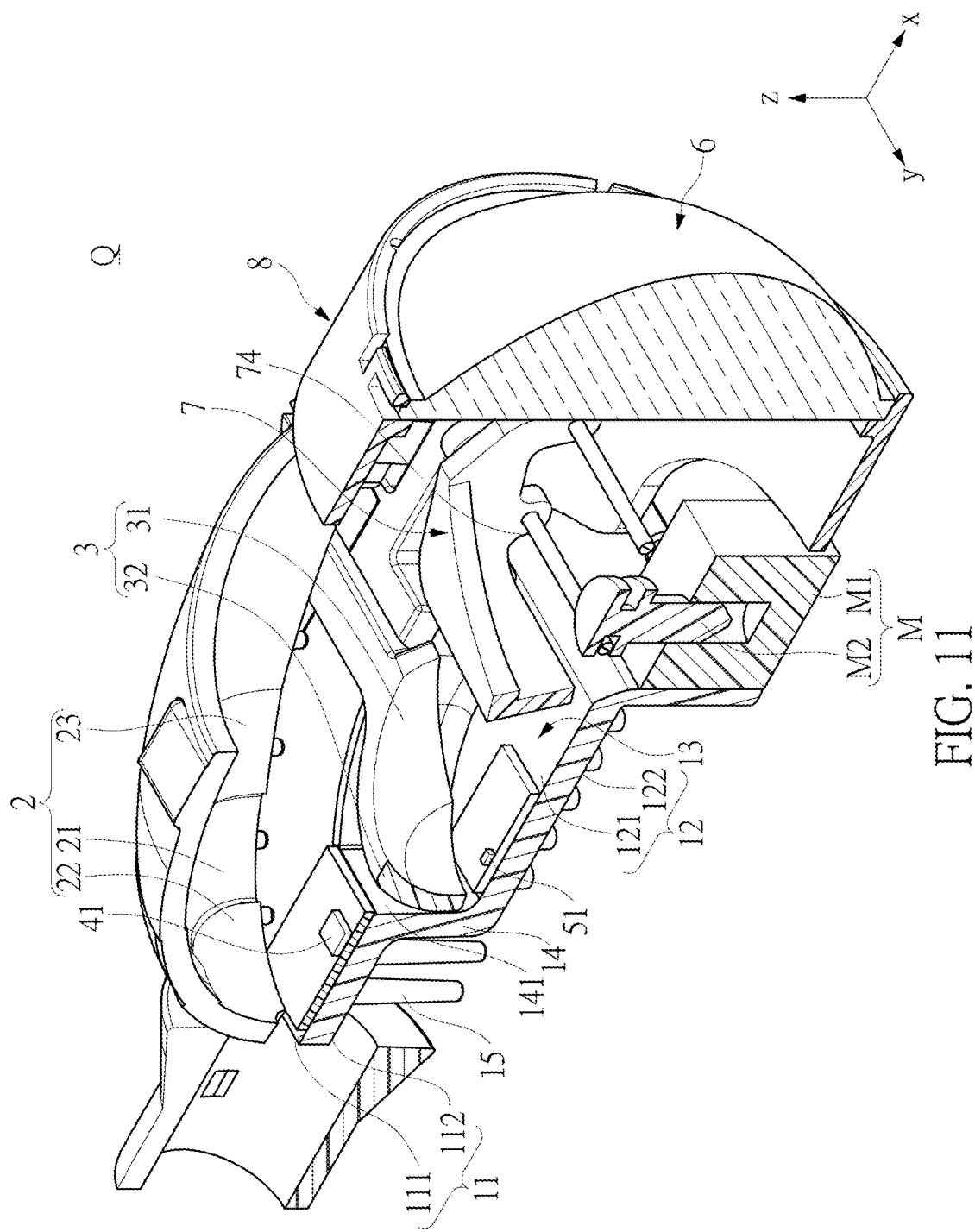
FIG. 11 is a cross-sectional view along the section line VIII-VIII in FIG. 1 according to still another embodiment of the present disclosure.

First, reference is made to FIG. 1 to FIG. 4 and FIG. 8. FIG. 1 to FIG. 4 are two perspective views and two exploded views of the vehicle light Q according to the first embodiment of the present disclosure. FIG. 8 is schematic view showing the main construction of the vehicle light Q under a high beam mode of operation. The present disclosure provides a vehicle lamp Q, which includes a base 1, a first reflection structure 2, a second reflection structure 3, a first light emitting structure 4, a second light emitting structure 5, a lens structure 6, and a shielding structure 7. For example, each of the first reflection structure 2 and the second reflection structure 3 is composed of multiple curved surfaces having different curvatures or a single curved surface; that is to say, the reflection structure can be composed of the curved surfaces based on the ellipsoid. In addition, the first reflection structure 2 and the second reflection structure 3 are disposed on the base 1. For example, the first reflection structure 2 and the second reflection structure 3 are fixed on the base 1 by use of the screwing member S, but the example is not meant to limit the scope of the present disclosure. Each of the first reflection structure 2 and the second reflection structure 3 may include a reflection surface respectively corresponding to the first light emitting structure 4 and the second light emitting structure 5 so as to reflect the light generated from the first light emitting structure 4 and the second light emitting structure 5. More specifically, the first reflection structure 2 can serve as a part of the lamp cup for low beam within the headlight, and the second reflection structure 3 can serve as a part of the lamp cup for high beam within the headlight. Furthermore, the high and low beam modes of operation can be switched through the rotating of the shielding structure 7 as shown in FIG. 6 and FIG. 11. In other words, a low beam light pattern is generated when the first light emitting structure 4 is lit, and the high beam light pattern is generated when the first light emitting structure 4 and the second light emitting structure 5 are lit and the shielding structure 7 is rotated, but the present disclosure is not limited thereto. For example, in addition to the aforementioned implementation that the light pattern of high or low beam is generated respectively through lighting the first light emitting structure 4 and the second light emitting structure 5 rotating the shielding structure 7, the light pattern of high or low beam is generated by simultaneously lighting the first light emitting structure 4 and the second light emitting structure 5 and rotating of the shielding structure 7 regardless of the low or high beam mode in another embodiment of the present disclosure. That is to say, the light emitted from the second light emitting structure 5 can contribute to the hot spot located in the low beam light pattern. Moreover, it should be noted that the first light emitting structure 4 and the second light emitting structure 5 can be a single LED chip or a package structure composed of a plurality of LED chips.

As described above, referring to FIG. 8, the first reflection structure 2 includes at least one first focal point 2a and at least one second focal point 2b corresponding to the at least one first focal point 2a of the first reflection structure 2, and the second reflection structure 3 includes a first focal point 3a and a second focal point 3b corresponding to the first focal point 3a of the second reflection structure 3. Particularly, the second focal point 3b of the second reflection structure 3 and the second focal point 2b of the first reflection structure 2 are disposed corresponding to each other. In the present embodiment, the second focal point 3b of the second reflection structure 3 and the second focal point 2b of the first reflection structure 2 are overlapped with each other, but the present disclosure is not limited thereto. That is to say, the second focal point 3b of the second reflection structure 3 may be disclosed adjacent to the peripheral of the second focal point 2b of the first reflection structure 2.

As described above, referring to FIG. 1 to FIG. 4 and FIG. 8, the base 1 has a first carrier surface 111 and a second carrier surface 121. The first carrier surface 111 and the second carrier surface 121 are disposed on different planes. The first light emitting structure 4 can be disposed on the first carrier surface 111 to generate a first light L1, and the second light emitting structure 5 can be disposed on the second carrier surface 121 to generate a second light L2. It should be noted that, the first light emitting structure 4 and the second light emitting structure 5 can be disposed on a circuit board (not shown in the figures), and the first light emitting structure 4 and the second light emitting structure 5 can be disposed on the base 1 via the circuit board.

As described above, referring to FIG. 8, the first light emitting structure 4 corresponds to the at least one first focal point 2a, and the second light emitting structure 5 corresponds to the at least one second focal point 2b. It should be noted that, the first light emitting structure 4 can be disposed directly on the first focal point 2a when the first light emitting structure 4 merely includes one first focal point 2a, but the present disclosure is not limited thereto. For example, referring to FIG. 10, the first reflection structure 2 has two first focal points 211a, 212a separated from each other and two second focal points 211b, 212b corresponding respectively to the two first focal points 211a, 212a the first reflection structure 2 in another embodiment of the present disclosure. Furthermore, the second reflection structure 3 can also have two first focal points 3a separated from each other (not shown in figure) and two second focal points 3b corresponding respectively to the two first focal points 3a of the second reflection structure 3 (not shown in figure). In other words, when each of the first reflection structure 2 and the second reflection structure 3 has two or more first focal points 2a, 3a and two second focal points 2b, 3b, it signifies that each of the first reflection structure 2 and the second reflection structure 3 is a reflection structure having two or more optical axes. It should be noted that the implementation of the first reflection structure 2 with two or more first focal points 2a (such as the aforementioned 211a, 212a in FIG. 10) is explained in the following descriptions of the present disclosure.

As described above, referring to FIG. 1 to FIG. 4 and FIG. 8, when the first light emitting structure 4 and the second light emitting structure 5 are lit simultaneously, the spatial relation between the second reflection structure 3 and the second light emitting structure 5 contributes to the hot spot located in the low beam light pattern under the low beam mode and further enhances the light intensity of the illuminated area under the high beam mode. In contrast, it is difficult for the light intensity of the illuminated area under the high beam mode resulting from the spatial relation between the first reflection structure 2 and the first light emitting structure 4 to reach the light intensity of the illuminated area under the high beam mode resulting from the spatial relation between the second reflection structure 3 and the second light emitting structure 5. Furthermore, the size of the second reflection structure 3 can be smaller than that of the first reflection structure 2. That is to say, the projected area of the first reflection structure 2 can be larger than that of the second reflection structure 3 as shown in FIG. 8. Meanwhile, the orthographic projection of the first reflection structure 2 can cover the whole orthographic projection of the second reflection structure 3. In other words, the second reflection structure 3 and the second light emitting structure 5 are completely covered by the first reflection structure 2 when viewed from above (along the direction that the first reflection structure 2 faces, i.e., toward the second reflection structure 3). Moreover, the surface area of the total reflection surface of the first reflection structure 2 (the combination of the first reflection surface 21, the second reflection surface 22, and the third reflection 23) is larger than that of the second reflection structure 3; particularly, the surface area of the total reflection surface of the first reflection structure 2 is at least double that of the second reflection structure 3. Therefore, the overall volume of the vehicle lamp Q is reduced dramatically through the structural design as described above. Also, the heat dissipation efficiency of the vehicle lamp Q can be enhanced by different configurations of the base 1.

Further referring to FIG. 8, the lens structure 6 has a lens optical axis A and a lens focal point 6a located on the lens optical axis A. More particularly, the at least one second focal point 2b of the first reflection structure 2 and the second focal point 3b of the second reflection structure 3 are located on the lens optical axis A or adjacent to the lens optical axis A. The present embodiment is demonstrated under the configuration that the at least one second focal point 2b of the first reflection structure 2 and the second focal point 3b of the second reflection structure 3 are located on the lens optical axis A as well as overlapped with the lens focal point 6a, but the example is not meant to limit the scope of the present disclosure. It should be noted that, in the present embodiment, the first focal point 3a of the second reflection structure 3 can be disposed between the lens focal point 6a and the at least one first focal point 2a (as shown in FIG. 8) or beneath the first reflection structure 2, since the size of the second reflection structure 3 can be smaller than that of the first reflection structure 2. Furthermore, the lens structure 6 can have a diameter D, the second reflection structure 3 can have a predetermined height R, and the size of the predetermined height R is in a range of D/7 to D/2 in the present embodiment.

Figure 1:
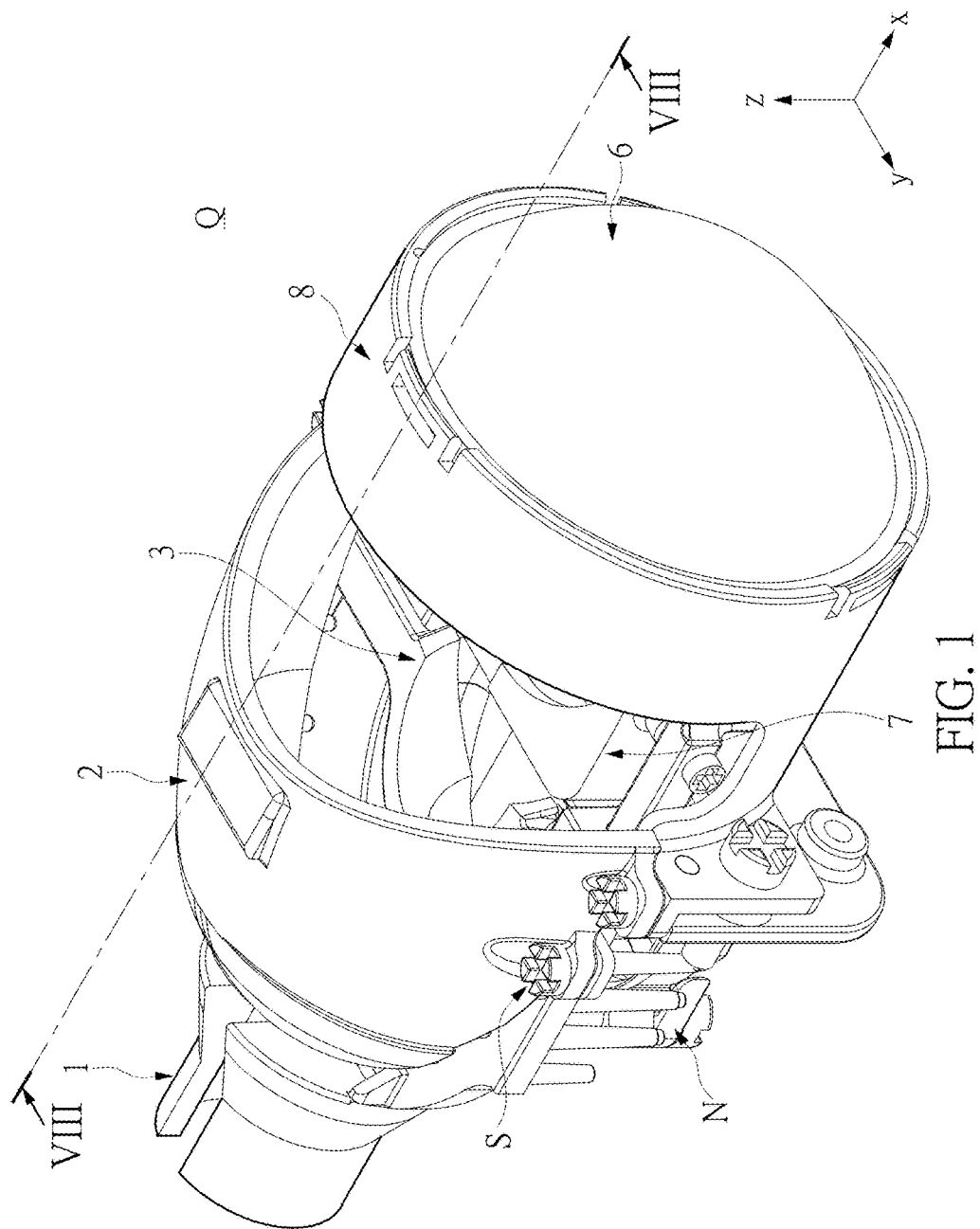
FIG. 1 is an assembled perspective view of a vehicle light according to a first embodiment of the present disclosure.
Figure 2:
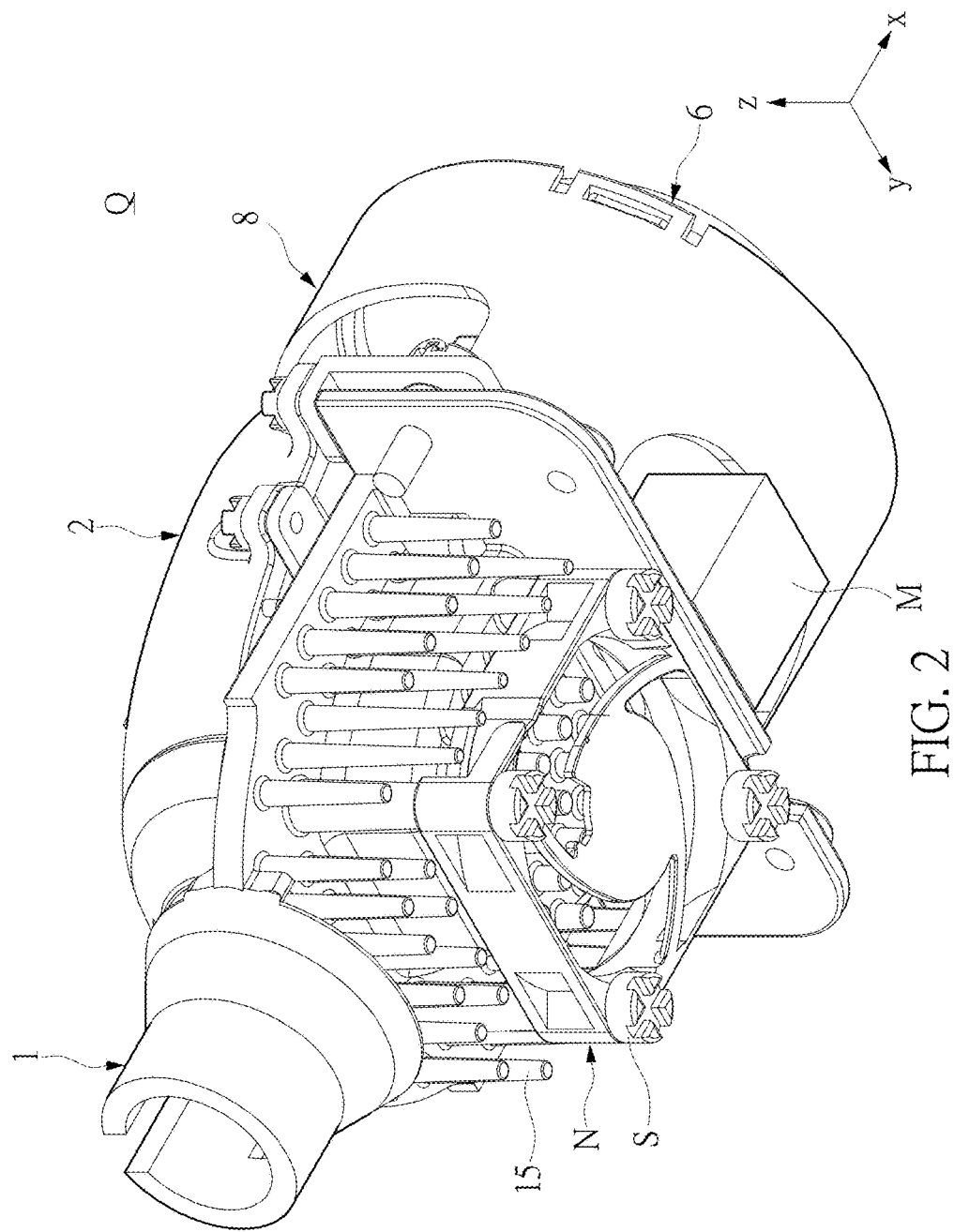
FIG. 2 is another assembled perspective view of the vehicle light according to the first embodiment of the present disclosure.
Figure 3:
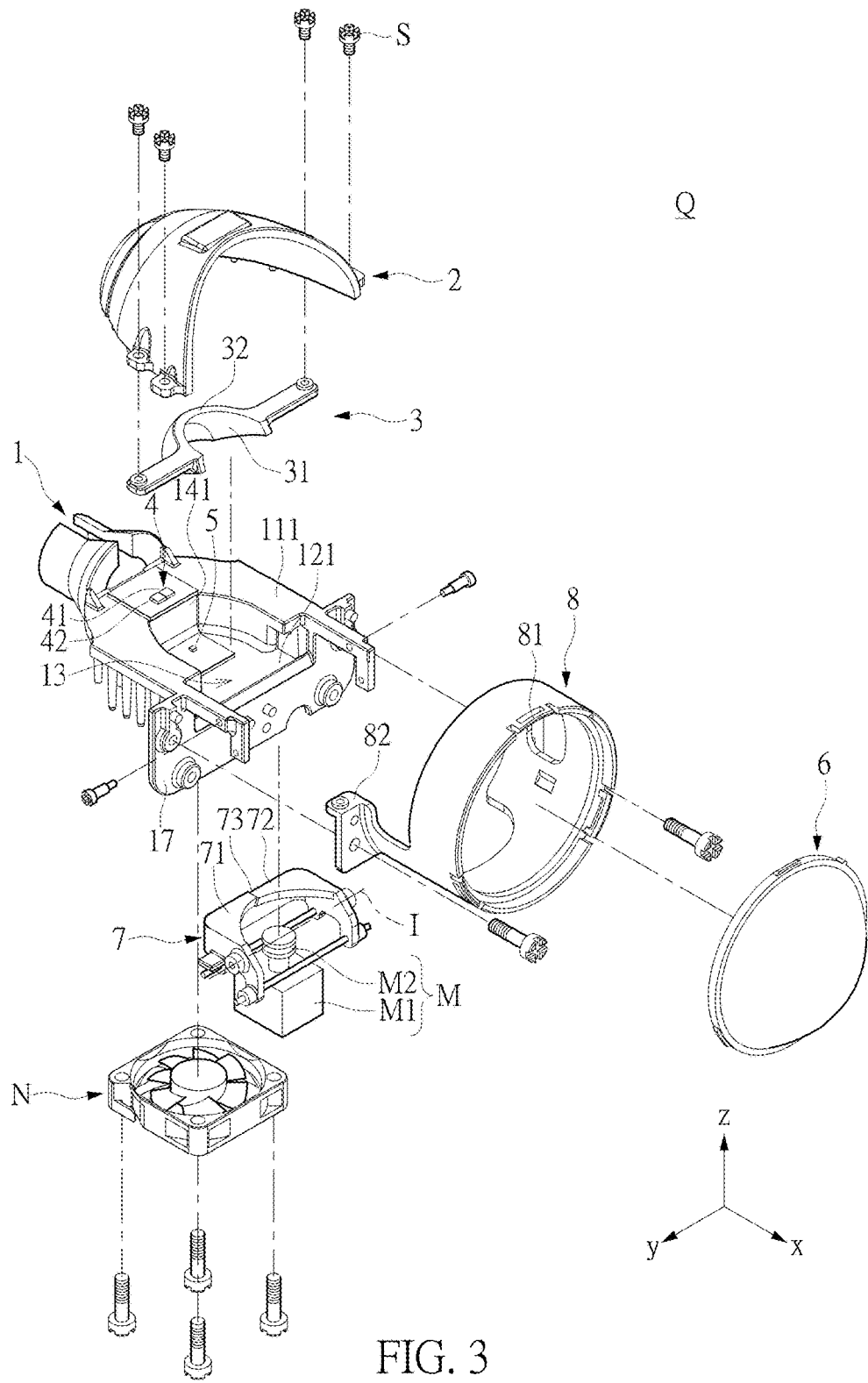
FIG. 3 is an exploded perspective view of the vehicle light according to the first embodiment of the present disclosure.
Figure 4:
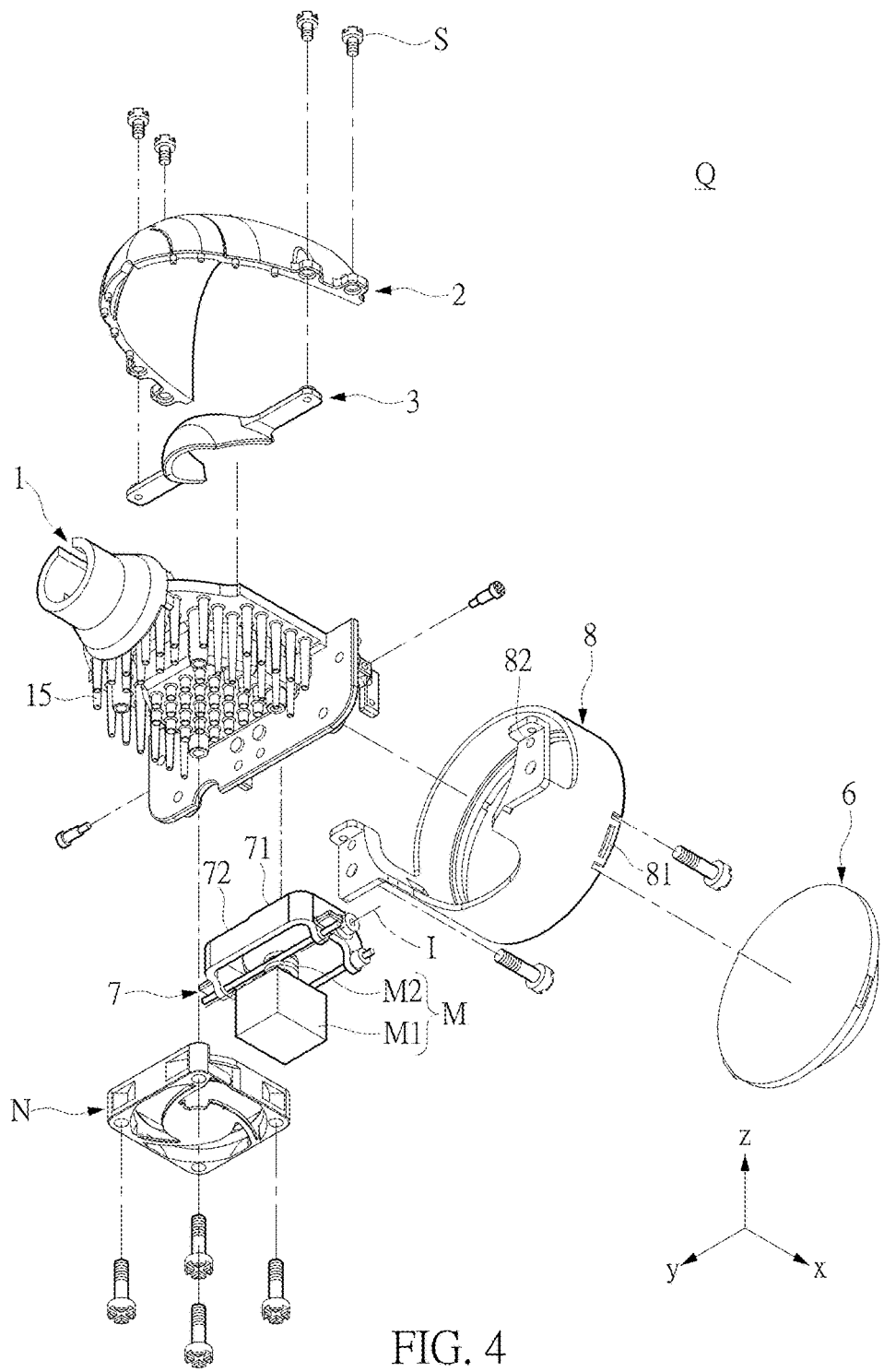
FIG. 4 is another exploded perspective view of the vehicle light according to the first embodiment of the present disclosure.

Next, referring to FIG. 3 and FIG. 4, the base 1 preferably further includes a container 13 recessed from the first surface 111, and the second reflection structure 3 and the second light emitting structure 5 are disposed in the container 13 in the present embodiment. The second carrier surface 121 can be disposed on the bottom surface of the container 13, and the container 13 further includes an inner side surface 141 connecting between the first carrier surface 111 and the second carrier surface 121. For example, the first carrier surface 111 and the second carrier surface 121 are disposed substantially parallel with each other; however, the first carrier surface 111 and the second carrier surface 121 can be tilted relative to on each other according to another embodiment. It should be noted that both of the first carrier surface 111 and the second carrier surface 121 face toward a predetermined direction z (upward above a horizontal plane) when the first carrier surface 111 and the second carrier surface 121 disposed parallel with each other, but the present disclosure is not limited to the direction perpendicular to the horizontal plane. In the second embodiment, the second carrier surface 121 can be obliquely disposed and faced toward the upward direction above the horizontal plane. That is to say, both of the first carrier surface 111 and the second carrier surface 121 face toward the predetermined direction z which is the upward direction above the horizontal plane.

It should be noted that the predetermined gap G (as shown in FIG. 8), in a range of about 0 mm to about 5 mm, is preferably formed between a top portion 32 of the second reflection structure 3 and the lens optical axis A for preventing the first light L1 of the first light emitting structure 4 from being affected by the second reflection structure 3 in the present embodiment. That is to say, the reflection surface 31 of the second reflection structure 3 is preferably disposed in the container 13, and the top portion 32 of the second reflection structure 3 is disposed under the lens optical axis A. It should be noted that the top portion 32 of the second reflection structure 3 can be about 2 mm higher than the lens optical axis A in some circumstances to allow for manufacturing inconsistencies; that is, the lens optical axis A will disposed between the top portion 32 of the second reflection structure 3 and the second light emitting structure 5.

Figure 5A:
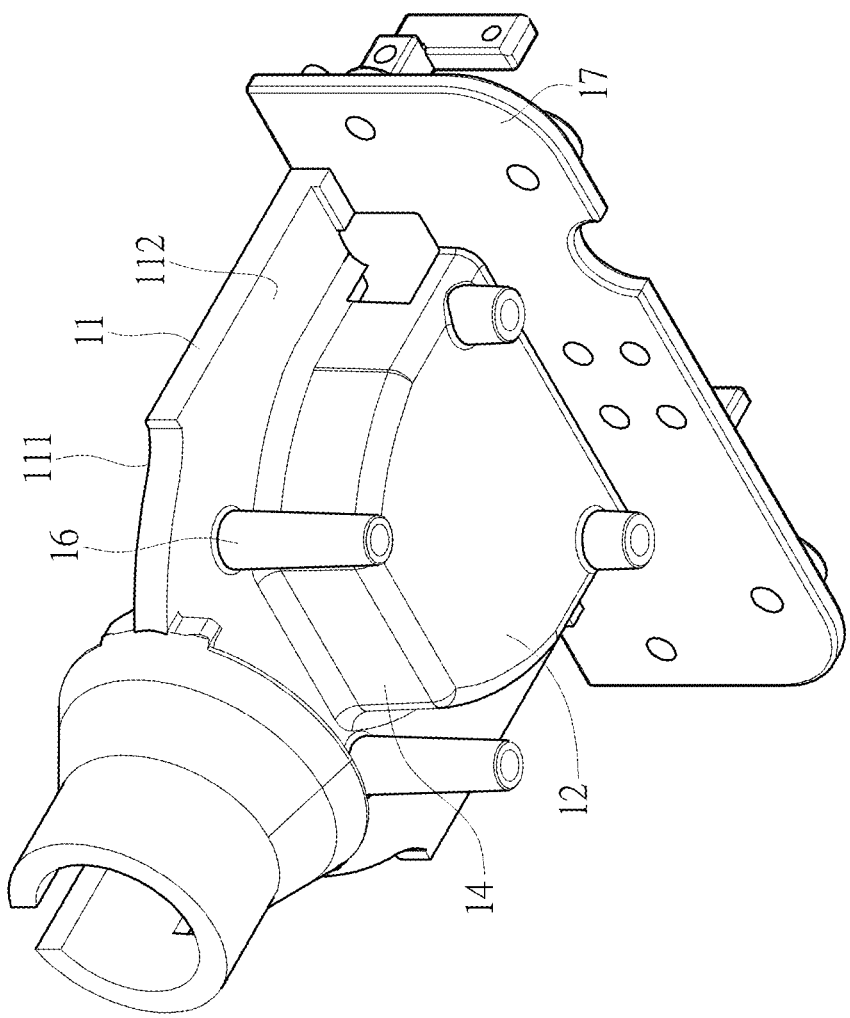
FIG. 5A is a schematic view showing another implementation of the base of the vehicle light according to the first embodiment of the present disclosure.
Figure 5B:
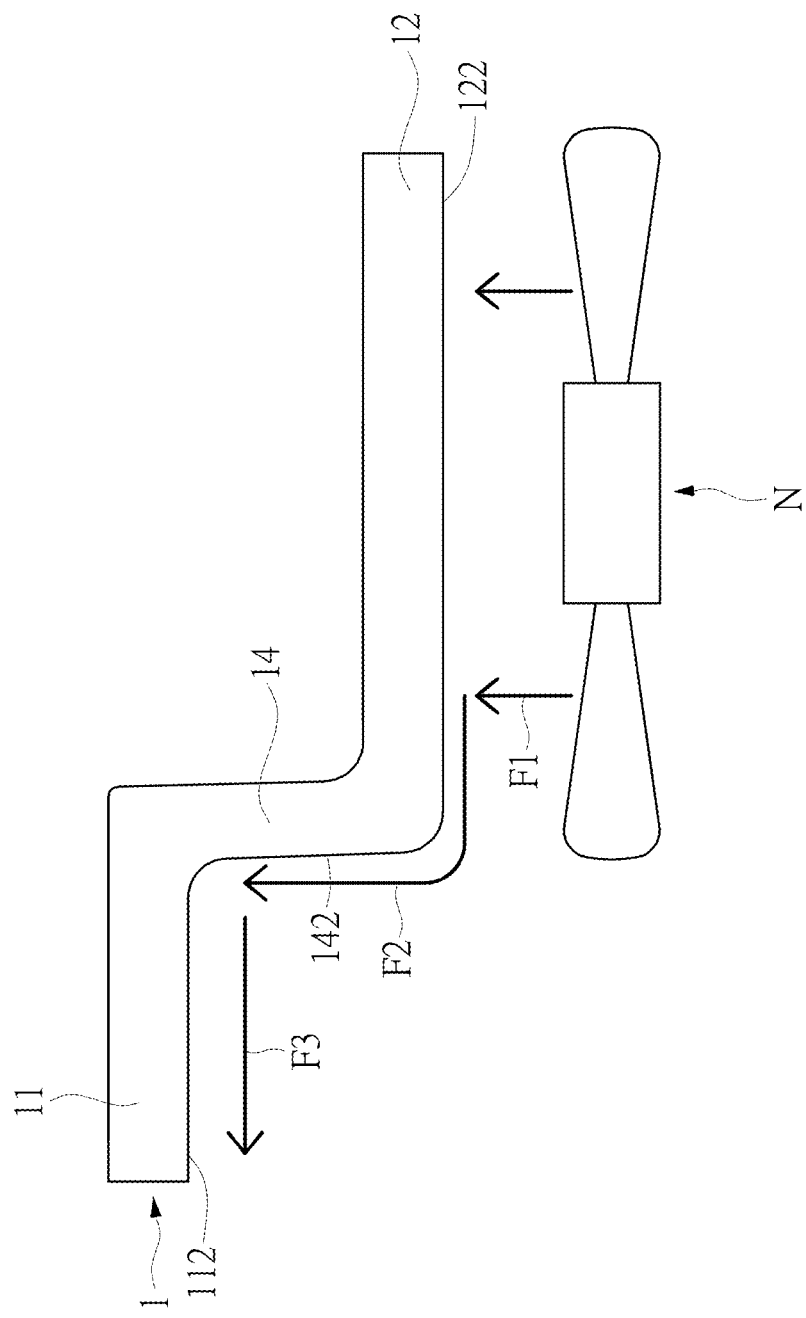
FIG. 5B is a side view showing the base and the pathway of the airflow generated from the fan structure according to the first embodiment of the present disclosure.

As described above, please refer to FIG. 3 and FIG. 4 in conjunction with FIG. 5A and FIG. 6; in order to present the whole configuration of the base 1, the heat dissipation structure 15 is omitted from the base 1 as shown in FIG. 5A. The base 1 can include a first carrier board 11 and a second carrier board 12 protruded from the first carrier board 11, the first carrier surface 111 can be disposed on the first carrier board 11, the second carrier surface 121 can be disposed on the second carrier board 12, the container 13 can be formed between the first carrier board 11 and the second carrier board 12, the container 13 can be surrounded by a connector 14 which is connected between the first carrier board 11 and the second carrier board 12, and the inner side surface 141 can be disposed on the connector 14. In other words, the material cost is decreased by the configuration that the second carrier board 12 protruded from the first carrier board 11. Meanwhile, the first light emitting structure 4 and the second light emitting structure 5 are staggered relative to each another because of the trapezoidal profile of the first carrier board 11, the connector 14, and the second carrier board 12 as well as the first light emitting structure 4 and the second light emitting structure 5 respectively disposed on the first carrier board 11 and the second carrier board 12. Therefore, the heat source can be dispersed and the dissipation area can be expanded so as to enhance the heat dissipation efficiency. Furthermore, it should be noted that the first carrier board 11 (or the first carrier surface 111) and the second carrier board 12 (or the second carrier surface 121) can be aligned in a non-parallel relationship in other embodiments of the present disclosure.

Figure 15A:
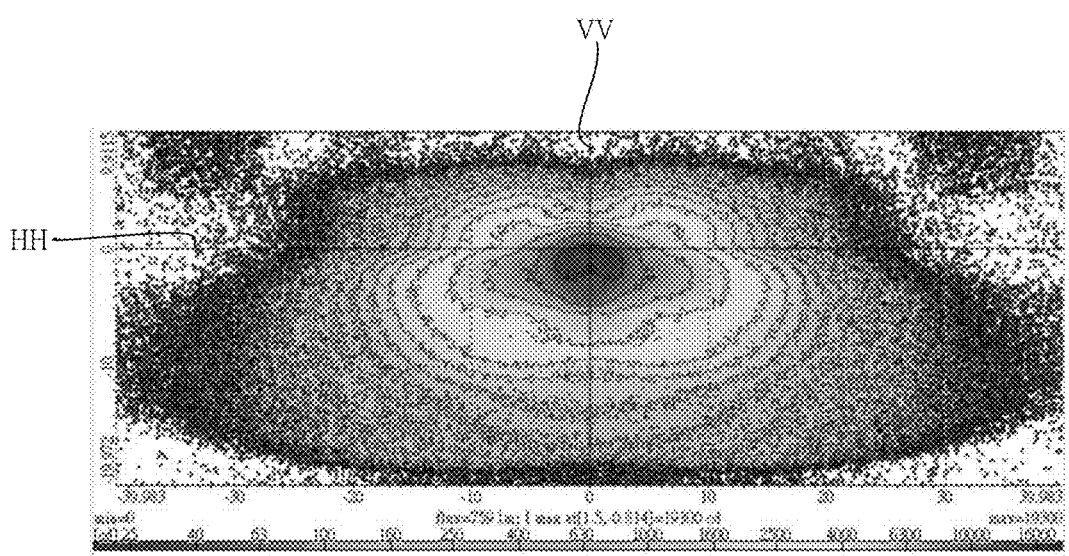
FIG. 15A is a schematic view showing the projection of one light pattern generated from the first reflection structure of the vehicle lamp according to the present disclosure.

As described above, referring to FIG. 3 to FIG. 6, the base 1 further includes a plurality of heat dissipation structures 15 (not shown in FIG. 15A). The heat dissipation structures 15 (i.e., heat-dissipation fins) are disposed on a first heat dissipation surface 112 corresponding to the first carrier surface 111 or a second heat dissipation surface 122 corresponding to the second carrier surface 121, and the heat dissipation structures 15 extend toward a direction away from the first carrier surface 111 and a direction away from the second carrier surface 121 (a direction under the horizontal plane). For example, the heat dissipation structures 15 can be pillars or sheets, but it is not meant to limit the scope of the present disclosure. It should be noted that the extending length of the heat dissipation structures 15 disposed on the second dissipation surface 122 can be longer than the extending length of the heat dissipation structures 15 disposed on the first dissipation surface 112 since the second carrier board 12 is protruded from the first carrier board 11 via the connector 14; therefore, the present disclosure can improve the heat dissipation efficiency dramatically. Meanwhile, the connector 14 can also be surrounded by the heat dissipation structures 15 disposed on the first dissipation surface 112. In order to achieve better efficiency for the heat dissipation, the material of the base can be selected from the thermal conductive materials such as metal, ceramic or thermal conductive plastics which have the better efficacy for the heat conductivity. Otherwise, an additional thermal diffusion layer with the efficacy for the heat conductivity can be disposed on the base 1.

As described above, referring to FIG. 3 to FIG. 5B, the vehicle lamp Q further includes a fan structure N disposed on the base 1. In detail, the base 1 further includes a fixed part 16 for fixing the fan structure N, and the fixed part 16 can be disposed on the first dissipation surface 112 or the second dissipation surface 122. Accordingly, due to differences in height and length between the first carrier board 11 and the second carrier board 12, the fan structure N generates a first air flow F1 blowing to the second heat dissipation surface 122, the first airflow F1 flows along the second heat dissipation surface 122 and reaches the outer side surface 142 to generate a second airflow F2. Next, the second airflow F2 flows along the outer side surface 142 and blows to the first heat dissipation surface 112 to generate a third airflow F3, and the third airflow F3 flows along the first heat dissipation surface 112 and blows toward outside the first heat dissipation surface 112, so as to provide better efficiency for heat dissipation. It should be noted that the figures show the casing of the fan structure N without the fan blades for the convenience of expression, and a person of ordinary skill in the art should realize the real configuration of the common fan structure N.

Next, referring to FIG. 1 to FIG. 4, the vehicle lamp Q further includes a lens-carrier structure 8 disposed on the base 1, and the lens structure 6 is disposed on the lens-carrier structure 8. In detail, the base 1 further includes a holding part 17 disposed on the first carrier board 11 for fixing the lens-carrier structure 8. The lens-carrier structure 8 further includes a carrier part 81 for disposing the lens structure 6 and a connecting part 82 connected to the carrier part 81 for holding the lens-carrier structure 8 onto the holding part 17 disposed on the base 1.

Next, referring to FIG. 1 to FIG. 4, the vehicle lamp Q further includes a shielding structure 7 swinging to-and-fro along a rotation axis I and disposed on the base 1, and the shielding structure 7 is disposed between the first reflection structure 2 and the second reflection structure 3. More particularly, the shielding structure 7 is driven by a driving unit M. For example, the driving unit includes an electromagnetic valve M1 and a rod M2 controlled by the electromagnetic valve M1. The rod M2 links a linking part 74 of the shielding structure 7, so that the shielding structure 7 is rotated along the rotation axis I. In detail, the shielding structure 7 includes the rotation axis I, a first surface 71, a second surface 72 corresponding to the first surface 71, and a cut-off edge 73 connecting the first surface 71 and the second surface 72. It should be noted that the first surface 71 and the second surface 72 of the shielding structure 7 can be a reflection surface such as an Al coating, or the first surface 71 and the second surface 72 can also be an absorption surface such as an extinction black-coating surface in another embodiment. That is to say, the first surface 71 and the second surface 72 may have the reflection effect or not, and the first surface 71 and the second surface 72 are not limited to the scope thereof in the reflection surface or the absorption surface. Furthermore, the lens optical axis A passes through the vicinity of the cut-off edge 73 when the first surface 71 of the shielding structure 7 is parallel with the lens optical axis A. For example, the shielding structure 7 is a shielding board with a cut-off line, which enables generation of a light pattern in compliance with regulatory laws by means of the profile of the cut-off edge 73.

Figure 7:
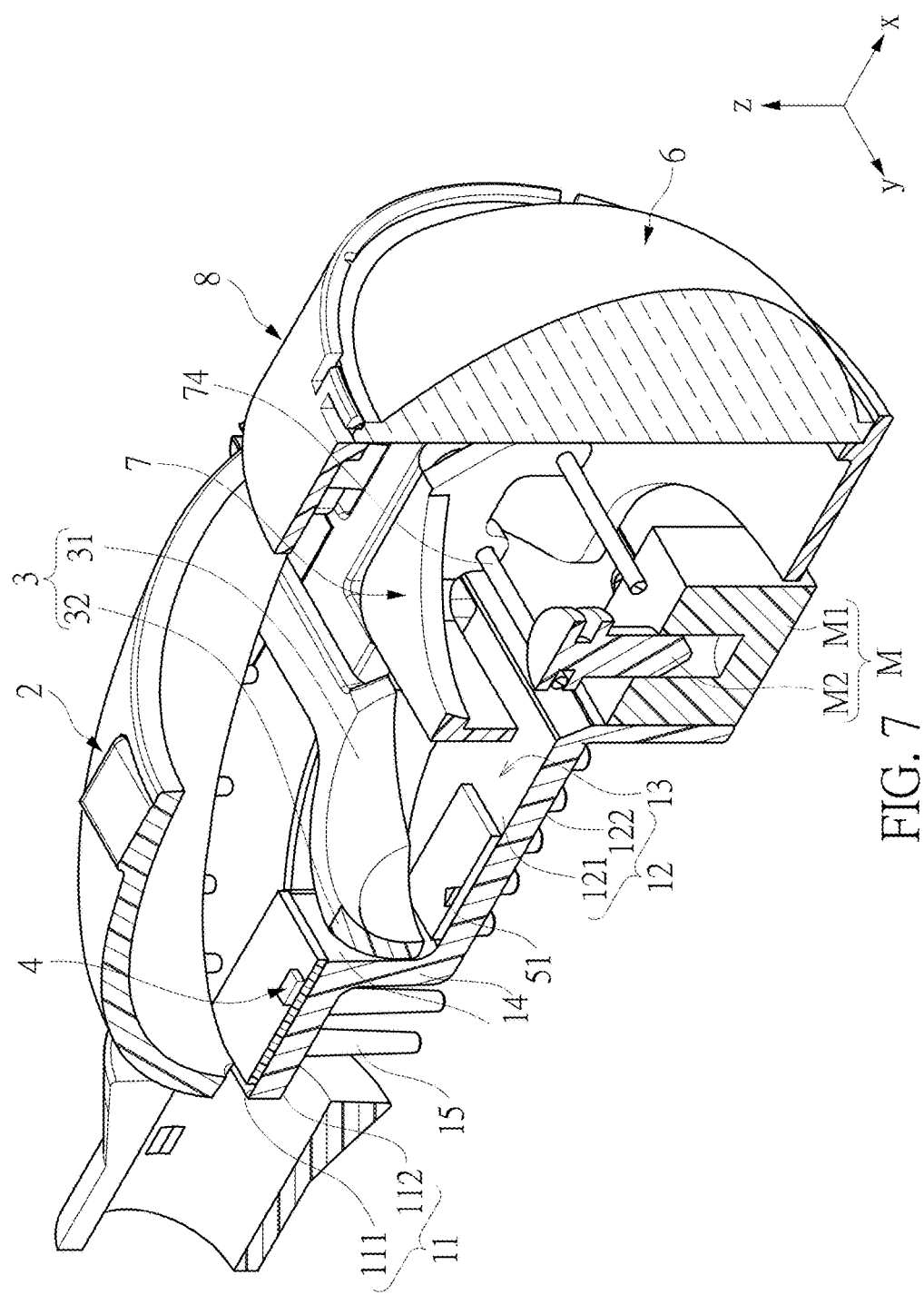
FIG. 7 is a cross-sectional view of the vehicle device with a different first reflection structure according to the first embodiment of the present disclosure.

Next, referring to FIG. 6 to FIG. 8, the pathway of the first light L1 and the second light L2 is further described as follows. In addition, it should be noted that the main differences between FIG. 6 and FIG. 7 reside in the first reflection structure 2 and the first light emitting structure 4. The first reflection structure 2 shown in FIG. 6 is a reflection structure composed of multiple curved surfaces of ellipsoid, and the first light emitting structure 4 includes a first light emitting element 41 and a second light emitting element 42. On the other hand, the first reflection structure 2 shown in FIG. 7 is a single curved surface of ellipsoid, and the first light emitting structure 4 includes a light emitting element corresponding to the first focal point 1a of the first reflection structure 2. The implementation shown in FIG. 7 is firstly exemplified; more particularly, the first reflection structure 2 has the first focal point 2a and the second focal point 2b corresponding to the first focal point 2a of the first reflection structure 2, and the second reflection structure 3 has the first focal point 3a and the second focal point 3b corresponding to the first focal point 3a of the second reflection structure 3. Meanwhile, the first light emitting structure 4 can include a light emitting element 41 such as an LED chip or LED array packaged by a plurality of LED chips, and preferably is a single LED chip. The light emitting element 41 of the first light emitting structure 4 is disposed on the at least one first focal points 2a of the first reflection structure 2, and the second light emitting structure 5 can include a light emitting element 51 disposed on the at least one first focal points 3a of the second reflection structure 3; but the present disclosure is not limited thereto. In other words, the first reflection structure 2 can also include a plurality of first focal points 2a and a plurality of second focal points 2b corresponding respectively to the first focal points 2a, and the second reflection structure 3 can also include a plurality of first focal points 3a and a plurality of second focal points 3b corresponding respectively to the first focal points 3a. In addition, the first light emitting structure 4 and the second light emitting structure 5 can also have a plurality of light emitting element. Furthermore, although the edge of the light emitting element 51 is parallel with the edge of the light emitting element 41 as shown in FIG. 6, the tiled angle formed between the edge of the light emitting element 51 and the edge of the light emitting element 41 can be about 45° by rotating the light emitting element 51 at a predetermined angle in the implementation of FIG. 7. Accordingly, the connecting line connected by the two vertexes furthest away from each other can be parallel with the lens optical axis A, so that the light intensity is further increased.

As described above, referring to FIG. 8, an optical axis of the second reflection structure 3 (not shown in FIG. 8) is interlaced with the lens optical axis A, and the optical axis of the second reflection structure 3 extends obliquely on the optical axis A. In addition, the first light L1 generated from the first light emitting structure 4 includes at least one first projection light L11 projected onto the first reflection structure. The at least one first projection light L11 is reflected by the first reflection structure 2 to form at least one reflected light L12 which passes through the at least one focal points 2b of the first reflection structure 2. Furthermore, the second light L2 generated from the second light emitting structure 5 includes the second projection light L21 projected onto the second reflection structure 3. The second projection light L21 is reflected by the second reflection structure 3 to form a second reflected light L22 which passes through the second focal points 3b of the second reflection structure 3. It should be noted that a part of the first projection light L11 and a part of the second projection light L21 are projected toward a predetermined direction z (upward). For example, in the implementation shown in FIG. 1 to FIG. 8, because that both of the first carrier surface 111 and the second carrier surface 121 face toward the predetermined direction z while the first light emitting structure 4 and the second light emitting structure 5 are disposed along the first carrier surface 111 and the second carrier surface 121 respectively, a part of the first projection light L11 and a part of the second projection light L21 are projected toward a direction upward (i.e. up above the horizontal plane) so as to be projected onto the first reflection structure 2 and the second reflection structure 3 respectively. It should be noted that when the first carrier surface 111 and the second carrier surface 121 are aligned in a non-parallel relationship (e.g. to be tilted relative to each other according to the second embodiment), a part of the first projection light L11 and a part of the second projection light L21 are projected preferably toward a direction upward (i.e. up above the horizontal plane) so as to be respectively projected onto the first reflection structure 2 and the second reflection structure 3 since the light emitting type of light-emitting diode (LED) is surface light source.

Figure 9:
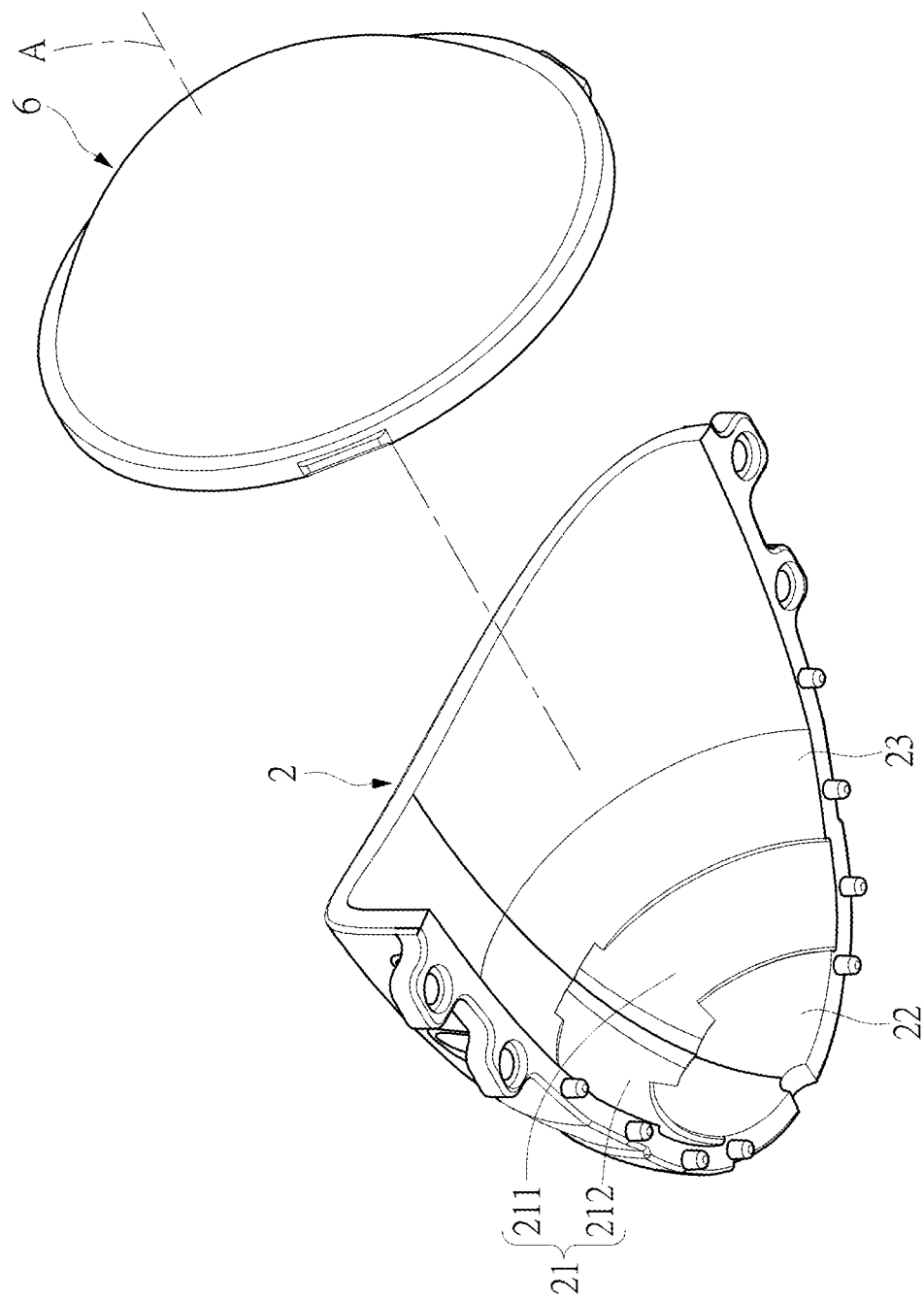
FIG. 9 is a perspective view illustrating the first reflection structure and a lens structure of the vehicle light according to one embodiment of the present disclosure.
Figure 10:
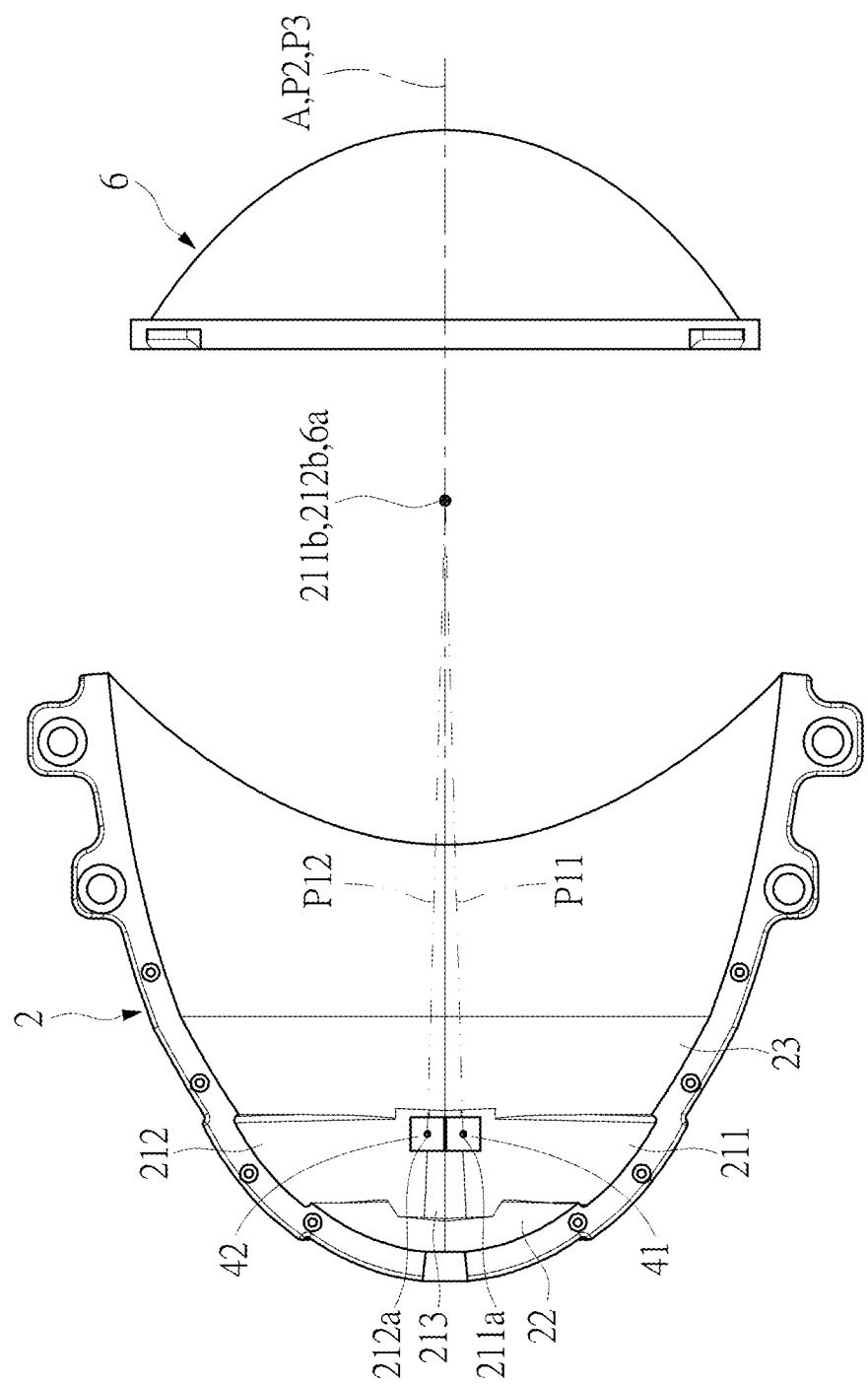
FIG. 10 is a top view showing the first reflection structure and the lens structure of the vehicle light according to one embodiment of the present disclosure.

Next, referring to FIG. 9 and FIG. 10, the implementation of the first reflection structure 2 with two first focal point 2a and two second focal point 2b is further described as follows. In detail, the first reflection structure 2 includes the first reflection surface 21 and the second reflection surface 22 connected to the first reflection surface 21. The first reflection surface 21 has a first optical axis P11 and a second optical axis P12, the second reflection surface 22 has an optical axis P2, and the first light emitting structure 4 includes a first light emitting element 41 and a second light emitting element 42. Each of the first light emitting element 41 and the second light emitting element 42 can be an LED chip. The distance between the edge of the first light emitting element 41 and the edge of the second light emitting element 42 can be in a range of about 0.2 mm to 5 mm, that is to say, the shortest distance between the first light emitting element 41 and the second light emitting element 42 can be in a range of about 0.2 mm to 5 mm.

It should be noted that the first reflection structure 2 further includes a third reflection surface 23 connected to the first reflection surface 21, the first reflection surface 21 is disposed between the second reflection surface 22 and the third reflection surface 23, and the third reflection surface 23 has an optical axis P3. Furthermore, the first reflection surface 21 can be composed of a first light-concentrating arc surface 211 and a second light-concentrating arc surface 212; and more preferably, the first reflection surface 21 can further include a light-scattering arc surface 213 disposed between the first light-concentrating arc surface 211 and the second light-concentrating arc surface 212.

As described above, referring to FIG. 10, the first reflection structure 2 has two first focal points 211a, 212a separated from each other and two second focal points 211b, 212b corresponding respectively with the two first focal points 211a, 212a, the first light emitting element 41 is disposed on the at least one first focal points 211a, the first light emitting element 42 is disposed on the other first focal point 212a, the two second focal points 211b, 212b are overlapped with each other, and the lens optical axis A passes through the two second focal points 211b, 212b of the first reflection surface 21 of the first reflection structure 2 when the lens focal point 6a is also overlapped with the two second focal points 211b, 212b. It should be noted that the two separated first focal points 211a, 212a of the first reflection surface 21 are the first focal point 211a of the first light-concentrating arc surface 211 and the first focal point 212a of the second light-concentrating arc surface 212, respectively; and the two separated second focal points 211b, 212b of the first reflection surface 21 are the second focal point 211b of the first light-concentrating arc surface 211 and the second focal point 212b of the second light-concentrating arc surface 212, respectively. In addition, the first optical axis P11 of the first reflection surface 21 passes through the first light emitting element 41, the second optical axis P12 of the first reflection surface 21 passes through the second light emitting element 42, and the optical axis P2 of the second reflection surface 22 and the optical axis P3 of the third reflection surface 23 is disposed between the first light emitting element 41 and the second light emitting element 42. Preferably, the optical axis P2 of the second reflection surface 22 and the optical axis P3 of the third reflection surface 23 are overlapped with the lens optical axis A. In other words, the first optical axis P11 is the connecting line connected by one of the first focal points 211a and one of the second focal points 211b, and the second optical axis P12 is the connecting line connected by the other one of the first focal points 212a and the other one of the second focal points 212b.

Next, referring to FIG. 6, FIG. 8, and FIG. 11, the difference between FIG. 11 and FIG. 6 are as follows: FIG. 6 shows the location of the shielding structure 7 under the low beam mode, and FIG. 8 and FIG. 11 shows the location of the shielding structure 7 under the high beam mode. That is to say, the shielding structure 7 can be pivoted relative to the rotation axis I. A predetermined pivot angle α is formed between the shielding structure 7 and the lens optical axis A, and the shielding structure 7 can swing to-and-fro among a predetermined interval of the pivot angle α ranging from about 15° to about 35°.

Figure 12:
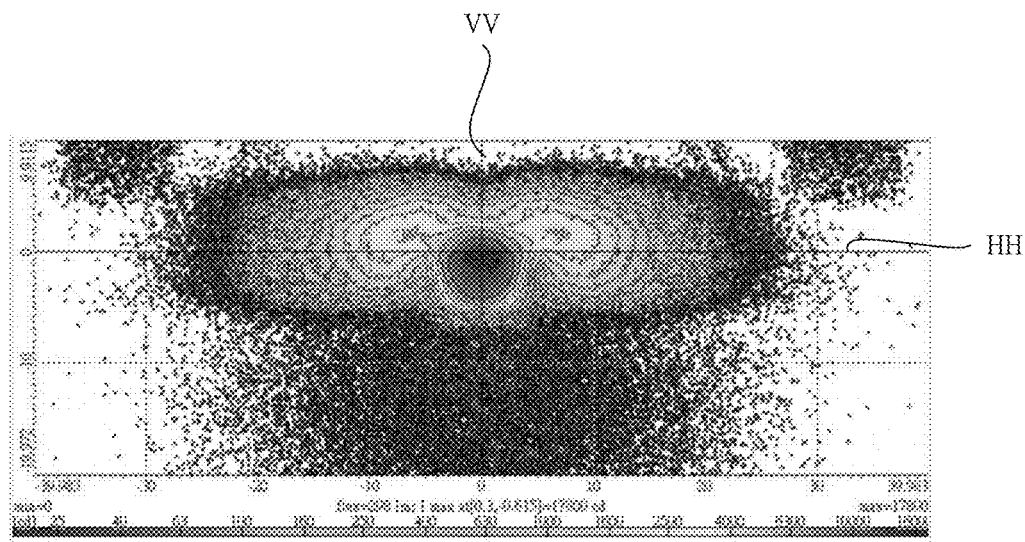
FIG. 12 is a schematic view showing the projection of the light pattern generated from the first reflection surface of the first reflection structure of the vehicle lamp according to the present disclosure.
Figure 13:
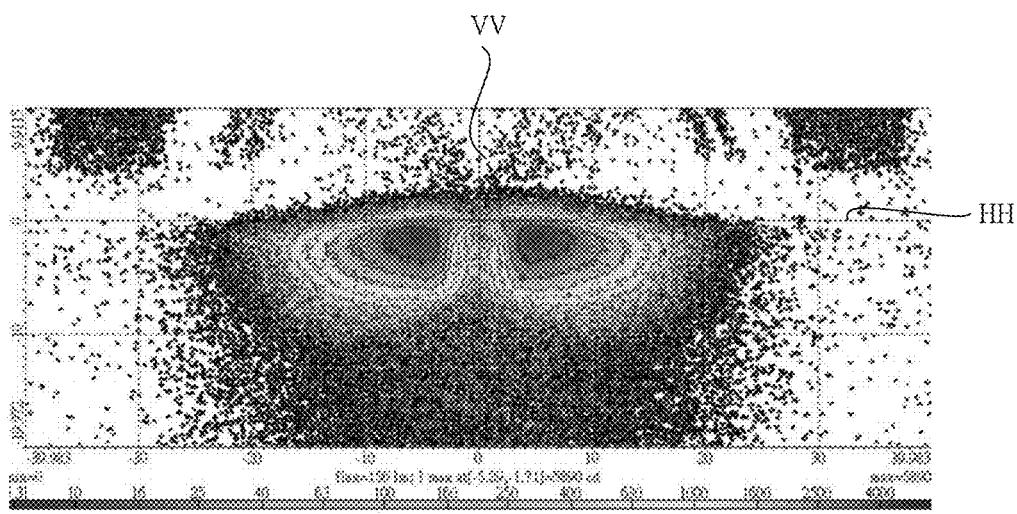
FIG. 13 is a schematic view showing the projection of the light pattern generated from the second reflection surface of the first reflection structure of the vehicle lamp according to the present disclosure.
Figure 14:
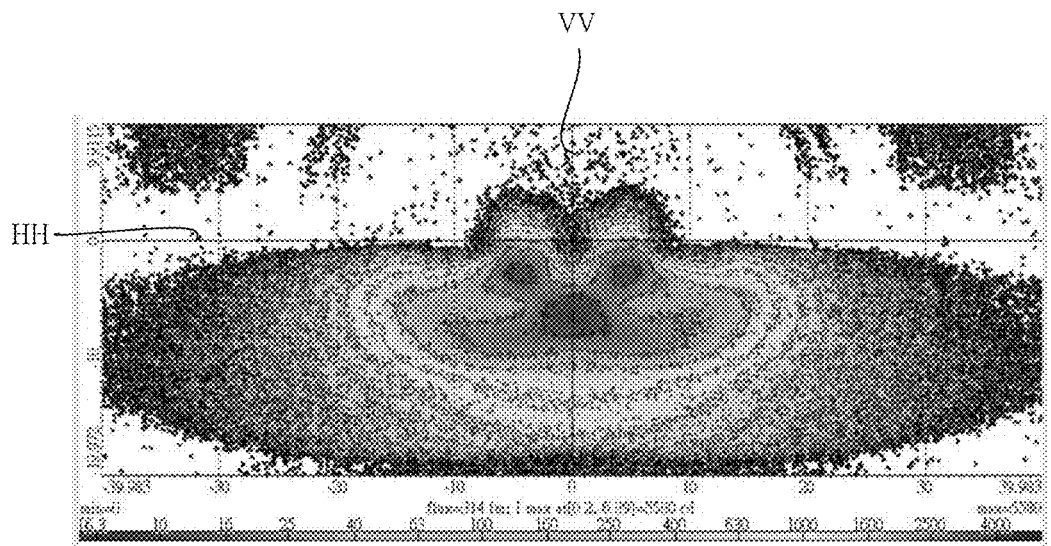
FIG. 14 is a schematic view showing the projection of the light pattern generated from the third reflection surface of the first reflection structure of the vehicle lamp according to the present disclosure.
Figure 15B:
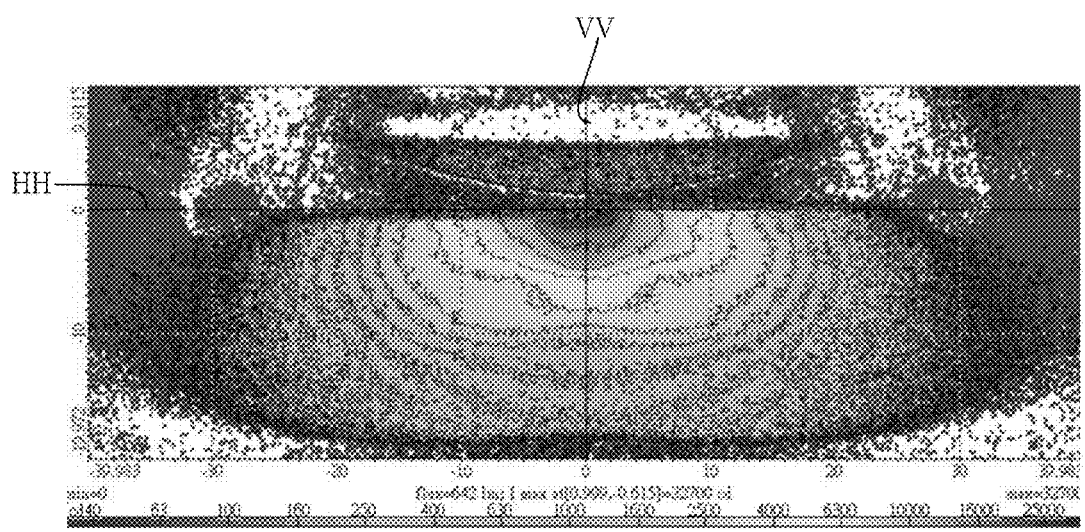
FIG. 15B is a schematic view showing the projection of another light pattern generated from the first reflection structure of the vehicle lamp according to the present disclosure.

Next, referring to FIG. 12 to FIG. 14, FIG. 12 to FIG. 14 are schematic views showing the projections of the light pattern generated from the first reflection surface 21, the second reflection surface 22, and the third reflection surface 23 of the first reflection surface 2, respectively. When the first light emitting structure 4 is lit, the projections of the light pattern are generated from the first reflection surface 21, the second reflection surface 22, and the third reflection surface 23 as shown in FIG. 12 to FIG. 14, respectively. The brightest area in the diagram of the light pattern as shown in FIG. 12 can be formed within the range of plus 7.5° to minus 7.5° since the first light emitting element 41 is disposed on the first focal point 211a of the first light-concentrating arc surface 211, the second light emitting element 42 is disposed on the first focal point 212a of the second light-concentrating arc surface 212, and the second focal point 211b of the first light-concentrating arc surface 211 and the second focal point 212b of the second light-concentrating arc surface 212 are overlapped with the lens focal point 6a. In addition, the second reflection surface 22 can be a curved surface of ellipsoid from a single optical axis or multiple optical axes, and preferably is a curved surface of ellipsoid from a single optical axis. The first focal point of the second reflection surface 22, which is located on the optical axis P2 and located between the first focal point 211a of the first light-concentrating arc surface 211 and the first focal point 212a of the second light-concentrating arc surface 212 (not shown in figures), is not located on the first light emitting element 41 and the second light emitting element 42. Although the second focal point of the second reflection surface 22 is located on the optical axis P2, the second focal point of the second reflection surface 22 can be overlapped with the lens focal point 6a or not. Therefore, the second reflection surface 22 can be applied for light distribution around the center of the light pattern in the range of plus 15° to minus 15°. Furthermore, the third reflection surface 23 can be a curved surface of ellipsoid from a single optical axis or multiple optical axes, and preferably is a curved surface of ellipsoid from a single optical axis. The first focal point of the third reflection surface 23, which is located on the optical axis P3 (not shown in figures), is not located on the first light emitting element 41 and the second light emitting element 42. Although the second focal point of the third reflection surface 23 is located on the optical axis P3, located between the first focal point 211a of the first light-concentrating arc surface 211 and the first focal point 212a of the second light-concentrating arc surface 212, and overlapped with the first focal point of the second reflection surface 22; the second focal point of the third reflection surface 23 can be overlapped with the lens focal point 6a or not. The main function of the third reflection surface 23 is to provide the effect of light diffusion in large scale. Next, referring to FIG. 15A, the first light emitting structure 4 can generate the projection of the light pattern as shown in FIG. 15A with regard to the first reflection surface 21, the second reflection surface 22, and the third reflection surface 23. In order to explain the effect of the first reflection structure 2, the state in FIG. 15A is that the shielding structure 7 rotated to the high beam mode and the second light emitting structure 5 is not lit. It can be understood that the light pattern satisfies the rule of low beam as well as the Emax (maximum illuminance) and HV point (the intersection point by the horizontal axis HH and the vertical axis VV in the light pattern) regulated by the rule of high beam under the configuration of the first light emitting structure 4 and the first reflection structure 2. It should be noted that the light intensity of HV point should be at least larger or equal to 80% of the light intensity of Emax point. Finally, if the low beam light pattern is needed, moving the shielding structure 7 to the position of low beam mode and forming the light pattern which complies with regulatory laws via the profile of the shielding structure 7 as shown in FIG. 15B.

Figure 16:
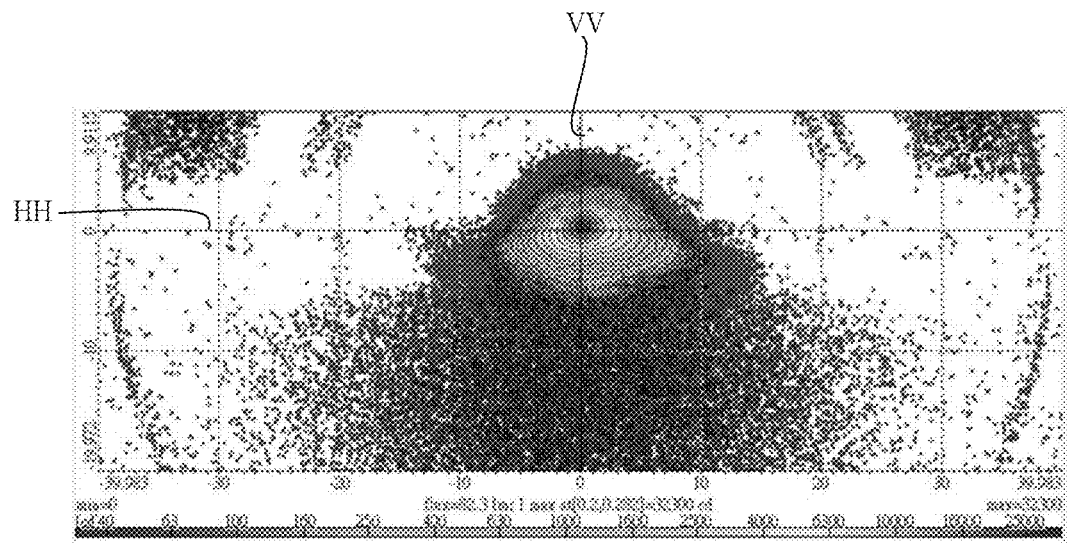
FIG. 16 is a schematic view showing the projection of the light pattern generated from the second reflection structure of the vehicle lamp according to the present disclosure.
Figure 17:
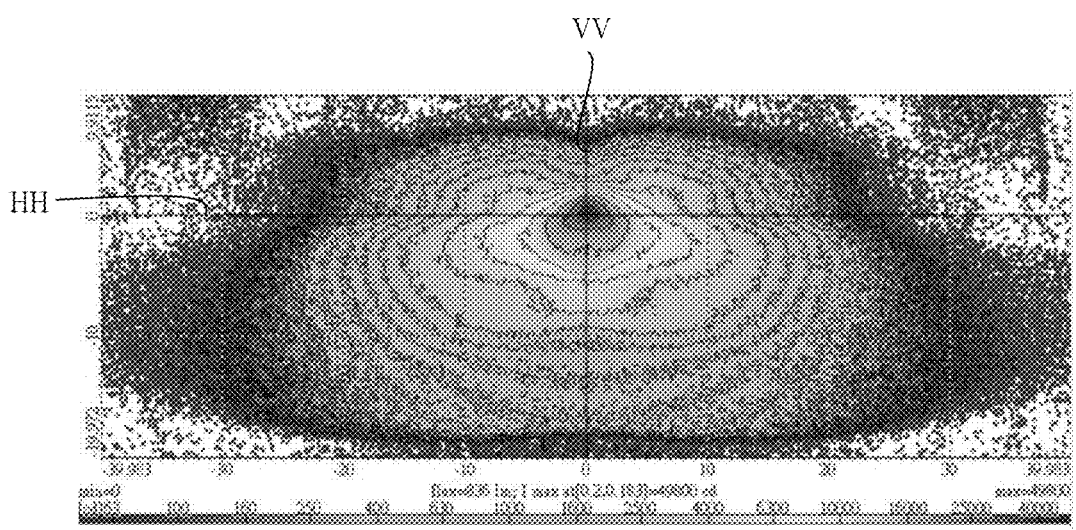
FIG. 17 is a schematic view showing the projection of the light pattern generated from the first reflection structure and the second reflection structure of the vehicle lamp according to the present disclosure.

Next, referring to FIG. 16, when the second light emitting structure 5 is lit and the shielding structure 7 is under the high beam mode, the light pattern of the projection is generated as shown in FIG. 16. The main function of the second reflection structure 3 is to satisfy high beam regulations concerning the Emax and HV point. It should be noted that the light intensity generated from the second light emitting structure 5 is smaller than the light intensity generated from the first light emitting structure 4 (i.e. the first light emitting element 41 and the second light emitting element 42). Moreover, referring to FIG. 17, when the first light emitting structure 4 and the second light emitting structure 5 are lit and the shielding structure 7 is rotated to the position of the high beam mode as shown in FIG. 11, the light pattern of the projection is generated as shown in FIG. 17.

As described above, that is to say, a first illuminated area can be formed by generating a first light L1 from the first light emitting structure 4 and projecting the first light L1 onto the lens structure 6 while the shielding structure 7 is located at the position of low beam mode, and the first illuminated area conforms to vehicle lamp regulations with regard to low beams. In addition, a second illuminated area can be formed by generating a second light L2 from the second light emitting structure 5 and projecting the second light L2 onto the lens structure 6 when the shielding structure 7 is located at the position of the high beam mode, and the light pattern generated from overlapping the first illuminated area and the second illuminated area conforms to vehicle lamp regulations with regard to high beams. Furthermore, the aforementioned regulations can be those under ECE R112 as mandated by the United Nations Economic Commission for Europe (ECE regulations), but it is not meant to limit the scope of the present disclosure.

Figure 18:
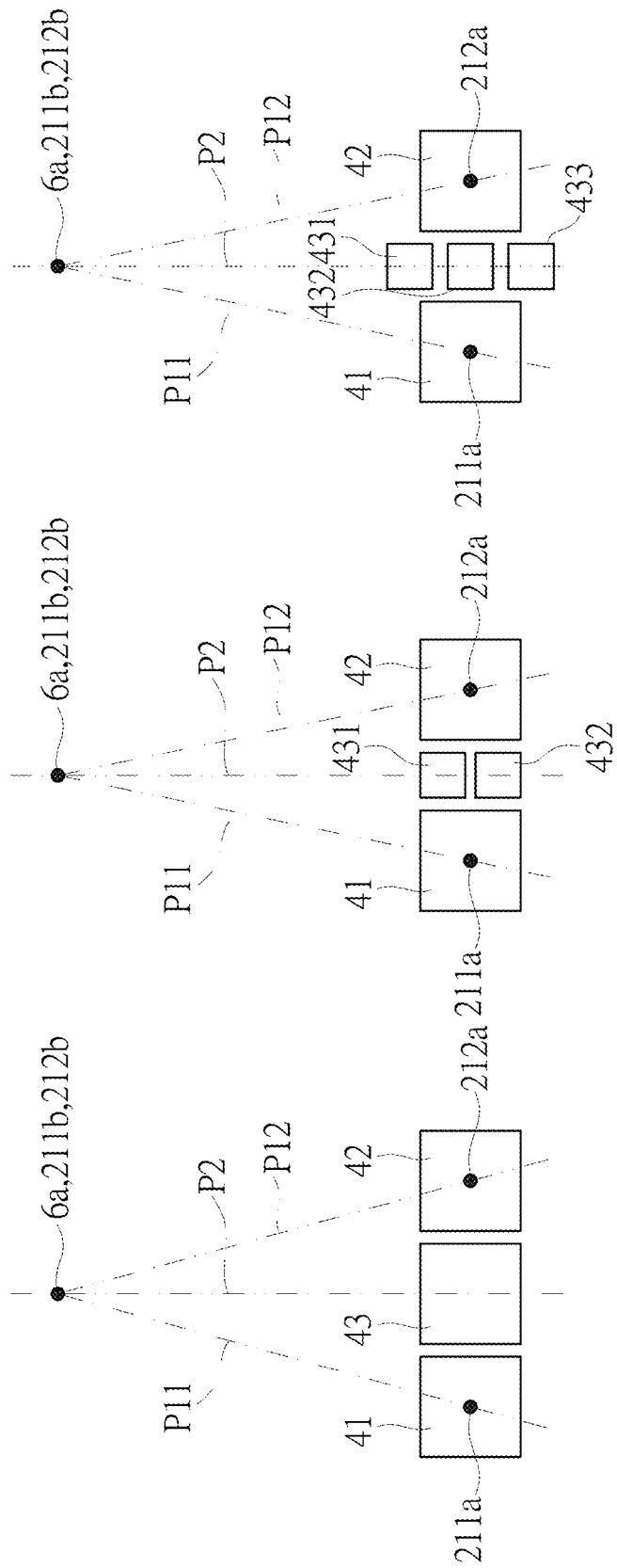
FIG. 18A is a schematic view showing the arrangement of one first light emitting structure of the vehicle lamp according to the present disclosure.
FIG. 18B is a schematic view showing the arrangement of another first light emitting structure of the vehicle lamp according to the present disclosure.
FIG. 18C is a schematic view showing the arrangement of still another first light emitting structure of the vehicle lamp according to the present disclosure.

Next, referring to FIG. 18A to 18C, the arrangement of the first light emitting structure 4 in another embodiment is further described as follows. The first light emitting structure 4 is further includes the third light emitting element 43 disposed between the first light emitting element 41 and the light emitting element 42, and the optical axis P2 of the second reflection surface 22 passes the third light emitting element 43. Preferably, the third light emitting element 43 is located on the first focal point of the second reflection surface 22. Referring to FIG. 18B, two third light emitting elements 431, 432 are disposed between the first light emitting element 41 and the second light emitting element 42. The size of the two third light emitting elements 431, 432 is smaller than that of the first light emitting element 41 and the second light emitting element 42, and the optical axis of the second reflection surface 22 passes through the two third light emitting elements 431, 432. In addition, the two third light emitting elements 431, 432 can be lit simultaneously while the second light emitting structure 5 is lit, so as to increase the light intensity under the high beam mode. Furthermore, three third light emitting elements 431, 432, 433 are disposed between the first light emitting element 41 and the second light emitting element 42 as shown in FIG. 18C, and the three third light emitting elements 431, 432, 433 can be lit simultaneously while the second light emitting structure 5 is lit.

Next, it should be noted that the size of the vehicle lamp Q of the present disclosure is described as follows. For example, when the size of the lens structure 6 (i.e. the diameter of the lens structure 6) is 60±5 mm, the focal distance can be ranged from about 30 mm to about 50 mm, preferably be about 40 mm. The distance between the vertex (the vertex of ellipse) of the first reflection structure 2 and the first focal point 2a of the first reflection structure 2 is in the range of about 5 mm to about 15 mm, preferably is in the range of about 6 mm to about 12 mm. The distance between the first focal point 2a and the second focal point 2b of the first reflection structure 2 is in the range of about 25 mm to about 60 mm, preferably is in the range of about 35 mm to about 45 mm. The distance between the vertex (the vertex of ellipse) of the second reflection structure 3 and the second focal point 3b of the second reflection structure 3 is shorter than the distance between the first focal point 2a of the first reflection structure 2 and the second focal point 2b of the first reflection structure 2.

In addition, for example, when the size of the lens structure 6 is 70±5 mm, the focal distance is in the range of about 30 mm to about 60 mm, preferably is about 42 mm. The distance between the vertex of the first reflection structure 2 and the first focal point 2a of the first reflection structure 2 is in the range of about 6 mm to about 15 mm, preferably is in the range of about 10 mm to about 14 mm. The distance between the first focal point 2a and the second focal point 2b of the first reflection structure 2 is in the range of about 25 mm to about 60 mm, preferably is in the range of about 30 mm to about 50 mm. The distance between the vertex of the second reflection structure 3 and the second focal point 3b of the second reflection structure 3 is shorter than the distance between the first focal point 2a of the first reflection structure 2 and the second focal point 2b of the first reflection structure 2.

Furthermore, for example, when the size of the lens structure 6 is 80±5 mm, the focal distance is in the range of about 40 mm to about 70 mm, preferably is about 50 mm. The distance between the vertex of the first reflection structure 2 and the first focal point 2a of the first reflection structure 2 is in the range of about 6 mm to about 15 mm, preferably is in the range of about 10 mm to about 14 mm. The distance between the first focal point 2a and the second focal point 2b of the first reflection structure 2 is in the range of about 25 mm to about 60 mm, preferably is in the range of about 35 mm to about 50 mm. The distance between the vertex of the second reflection structure 3 and the second focal point 3b of the second reflection structure 3 is shorter than the distance between the first focal point 2a of the first reflection structure 2 and the second focal point 2b of the first reflection structure 2.

[Second Embodiment]

First, please refer to FIG. 19 to FIG. 24, a vehicle lamp is provided in the second embodiment. Compared FIG. 23 with FIG. 6, the main differences between the first embodiment and the second embodiment is as follows: the base 1 further includes a light beam modulator 9 in the second embodiment, and the shielding structure 7 can have another shape distinguished from the aforementioned implement for cooperating with the configuration of the light beam modulator 9 and the base 1. In addition, the shielding structure 7 further includes a reflection part 76, and the first reflection structure 2 further includes reflection board 24. The efficiency of light concentration can be increased by obliquely disposing the second carrier surface 121 of the vehicle lamp Q. Meanwhile, a part of the light is further reflected onto the central position of the generated light pattern through the disposition of the light beam modulator 9, so as to increase the efficiency of light concentration under high beam mode. Moreover, the illuminance of residual light area in dark zone is further provided by the disposition of the reflection board 24 and the reflection part 76.

Next, referring to FIG. 19 to FIG. 24, the vehicle light Q includes a base 1, a reflection structure 2, a second reflection structure 3, a light emitting structure 4, a second light emitting structure 5, a lens structure 6, and a shielding structure 7. It should be noted that descriptions of similar components are omitted in the present embodiment. The special features of the present embodiment are described as follows.

As described above, referring to FIG. 19 to FIG. 22 and FIG. 24, the base 1 has a first carrier board 11 (the first carrier surface 111) and a second carrier board 12 (the second carrier surface 121) obliquely disposed on the first carrier board 11, and the face of the second carrier surface 121 of the second carrier board 12 is inclined upward. Also, the difference from the aforementioned embodiment is that a plurality of heat dissipation structures 15 (i.e., heat-dissipation fins) are disposed on a first heat dissipation surface 112 corresponding to the first carrier surface 111 or a second heat dissipation surface 122 corresponding to the second carrier surface 121. Furthermore, the second heat dissipation surface 122 can disposed along the second carrier surface 121 to be tilted relative to the lens optical axis A so as to obtain more space for disposing the heat dissipation structures 15.

As described above, referring to FIG. 24, the base 1 has a first carrier surface 111 and a second carrier surface 121 disposed on a different plane from the first carrier surface 111. The first carrier surface 111 can be parallel with the lens optical axis A, the first carrier surface 111 and the second carrier surface 112 are tilted relative to each other, so as to form a predetermined angle θ located between the first carrier surface 111 and the second carrier surface 121. The predetermined angle θ is in a range of about 7° to about 90°, preferably is in a range of about 12.5° to about 35°. Furthermore, the first carrier surface 111 and the second carrier surface 112 are tilted relative to each other, a part of the first projection light L11 generated from the first light emitting structure 4 and a part of the second projection light L21 generated from the second light emitting structure 5 are respectively projected onto the first reflection structure 2 and the second reflection structure 3 toward the upward direction above a horizontal plane.

Figure 19:
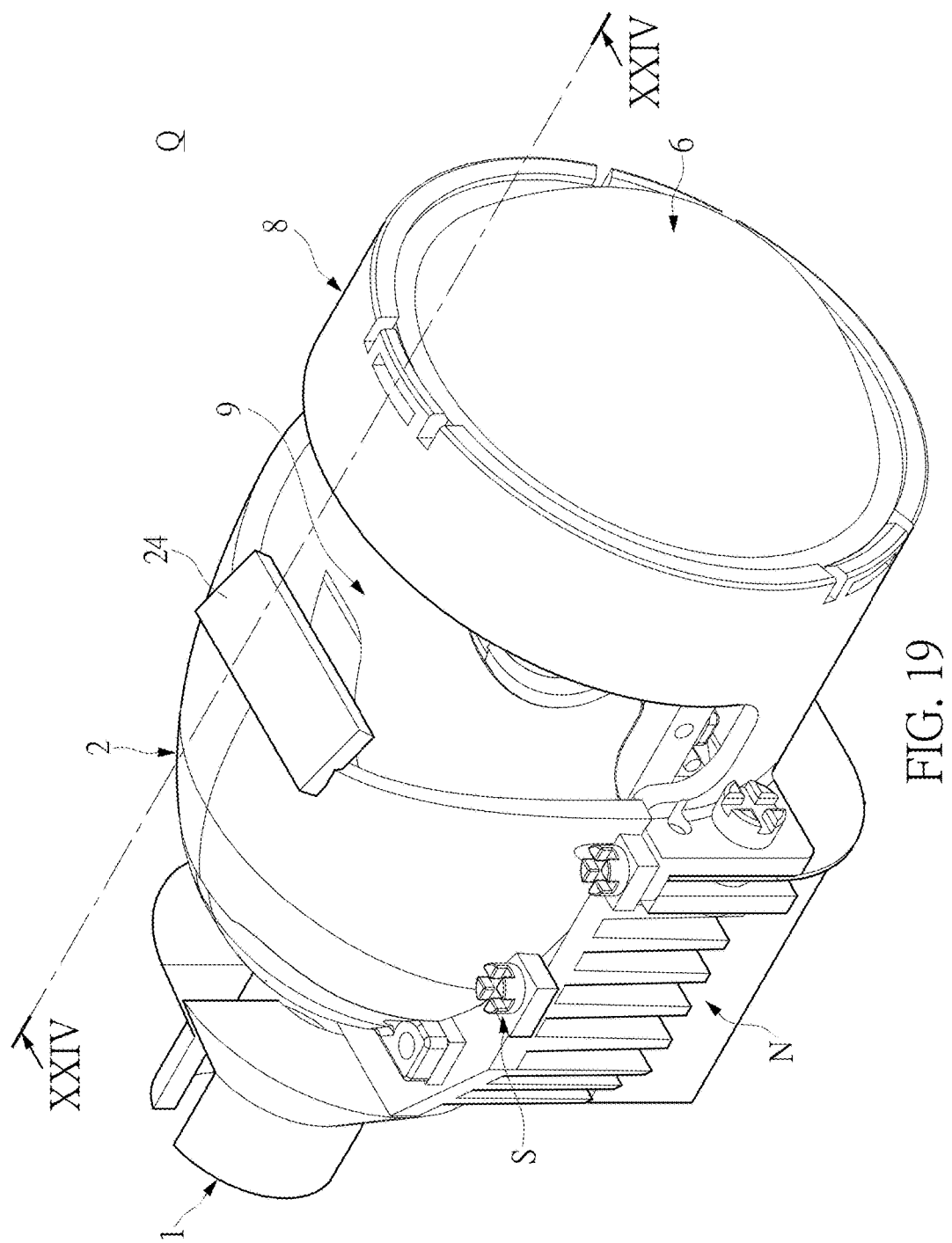
FIG. 19 is an assembled perspective view of the vehicle light according to a second embodiment of the present disclosure.
Figure 20:
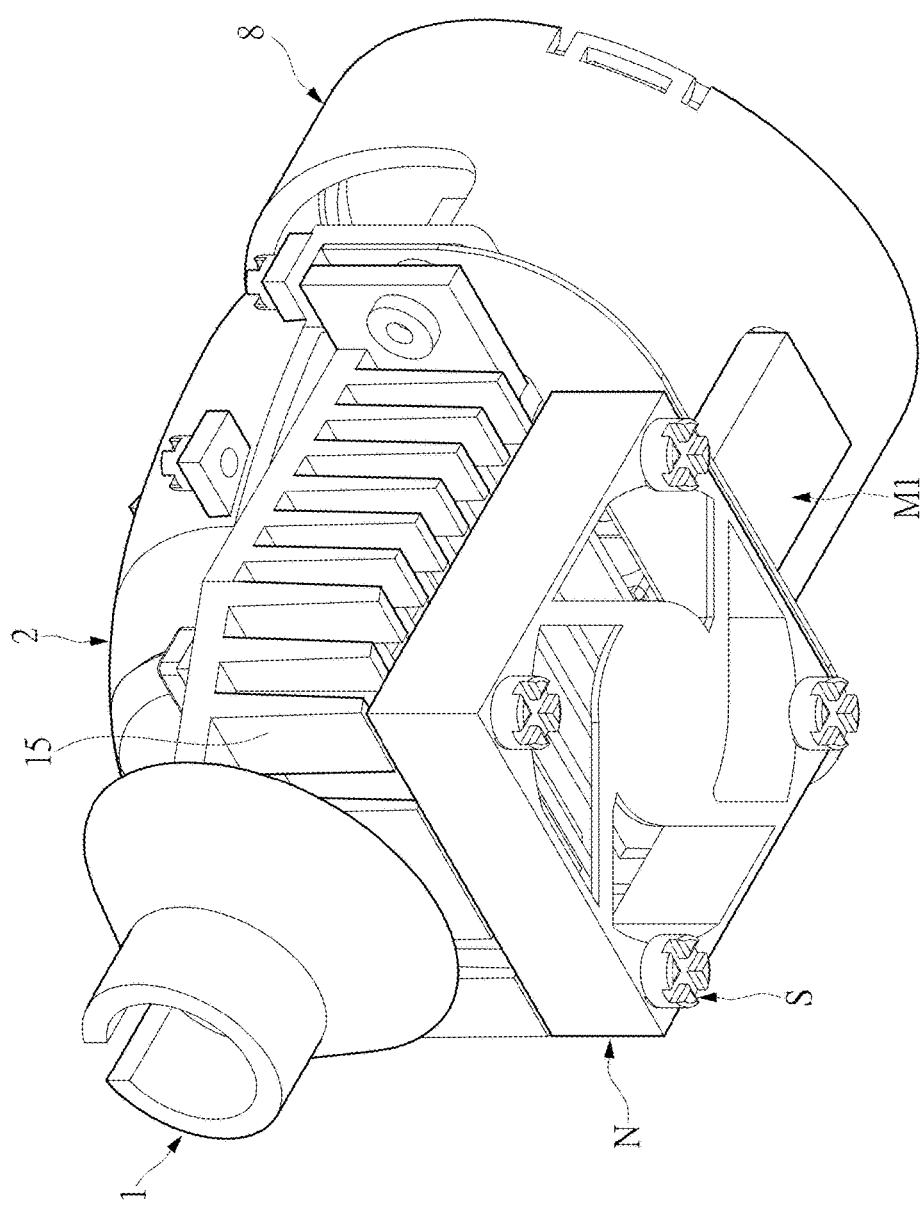
FIG. 20 is another assembled perspective view of the vehicle light according to the second embodiment of the present disclosure.
Figure 21:
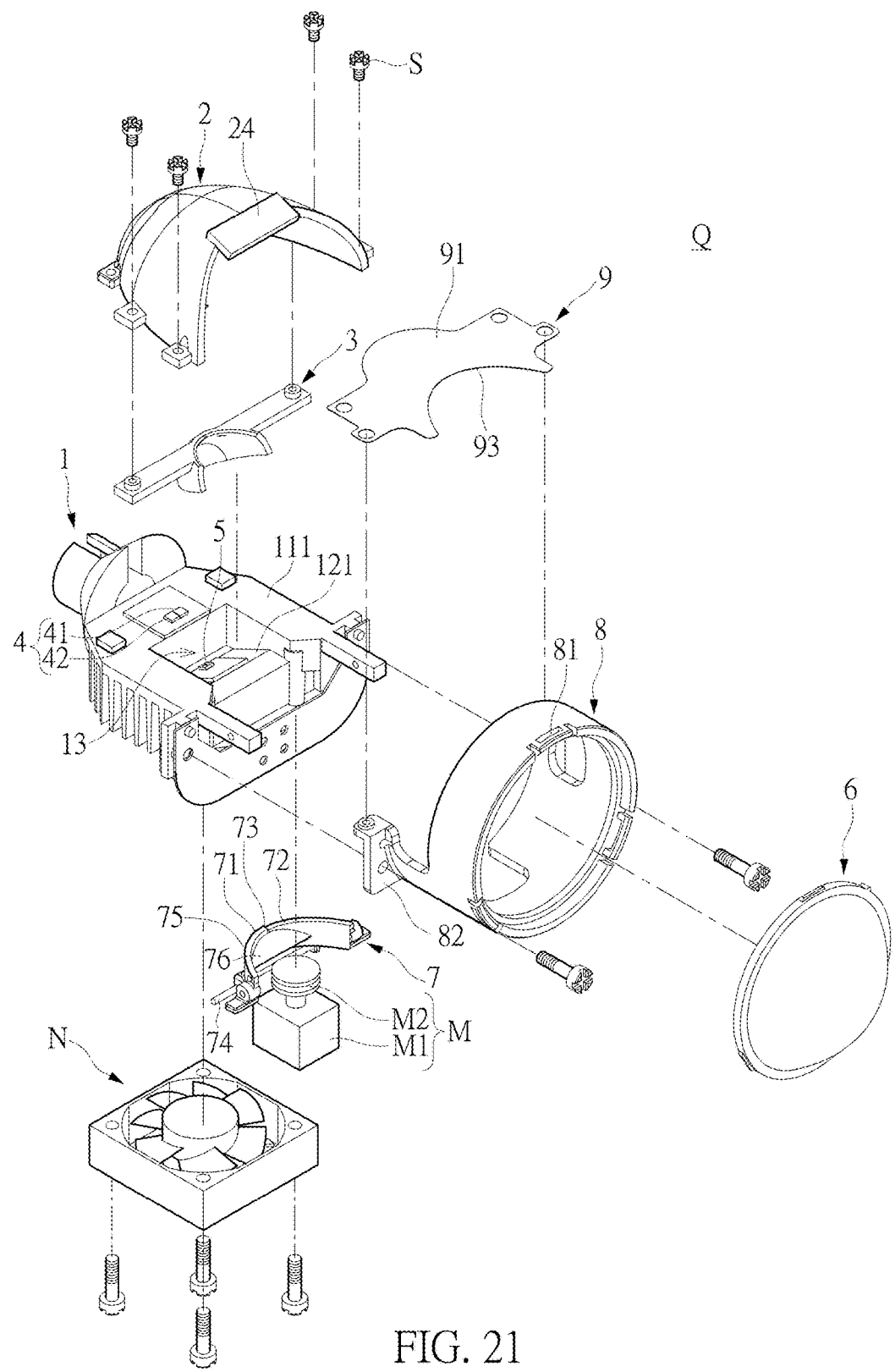
FIG. 21 is an exploded perspective view of the vehicle light according to the second embodiment of the present disclosure.
Figure 22:
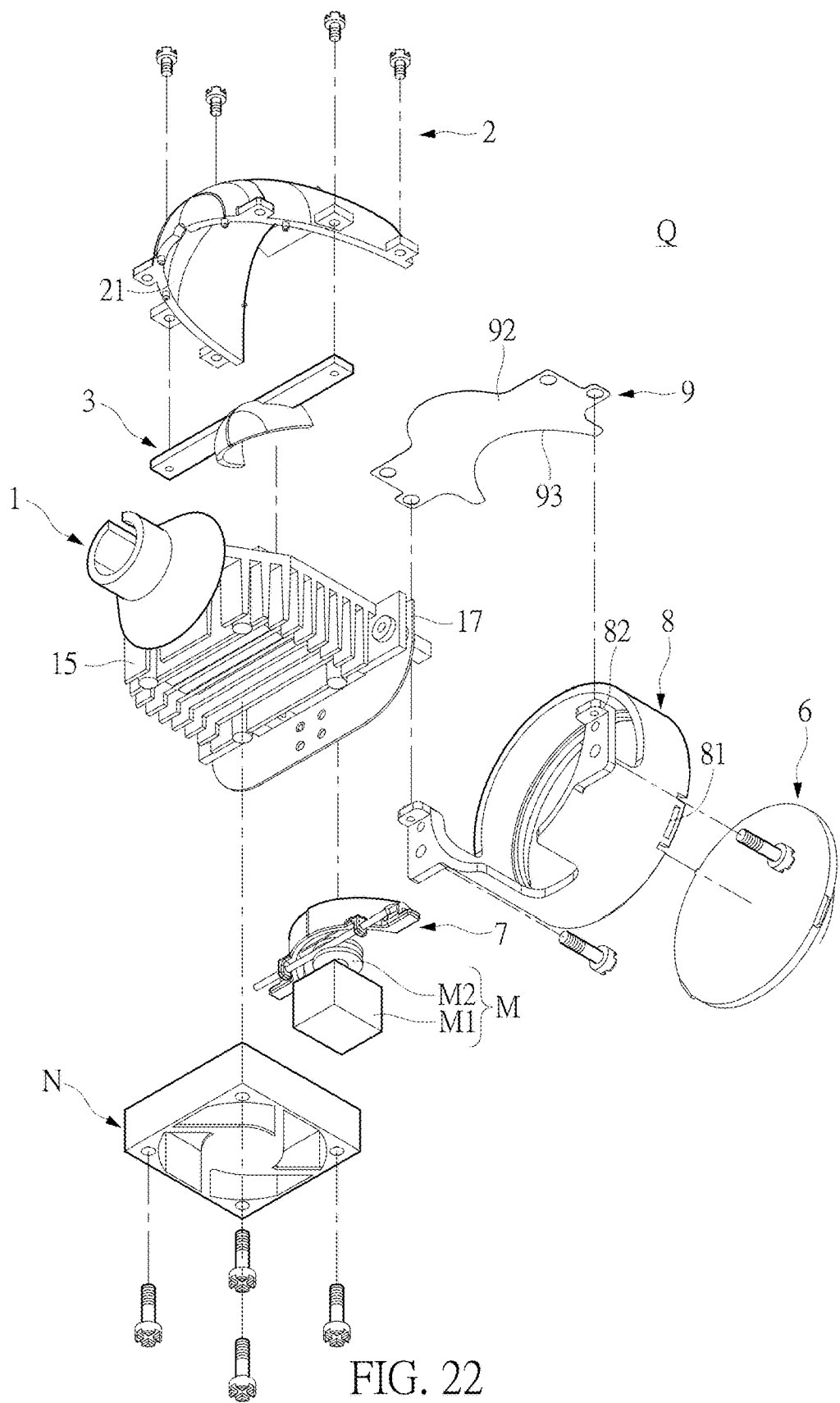
FIG. 22 is another exploded perspective view of the vehicle light according to the second embodiment of the present disclosure.
Figure 23:
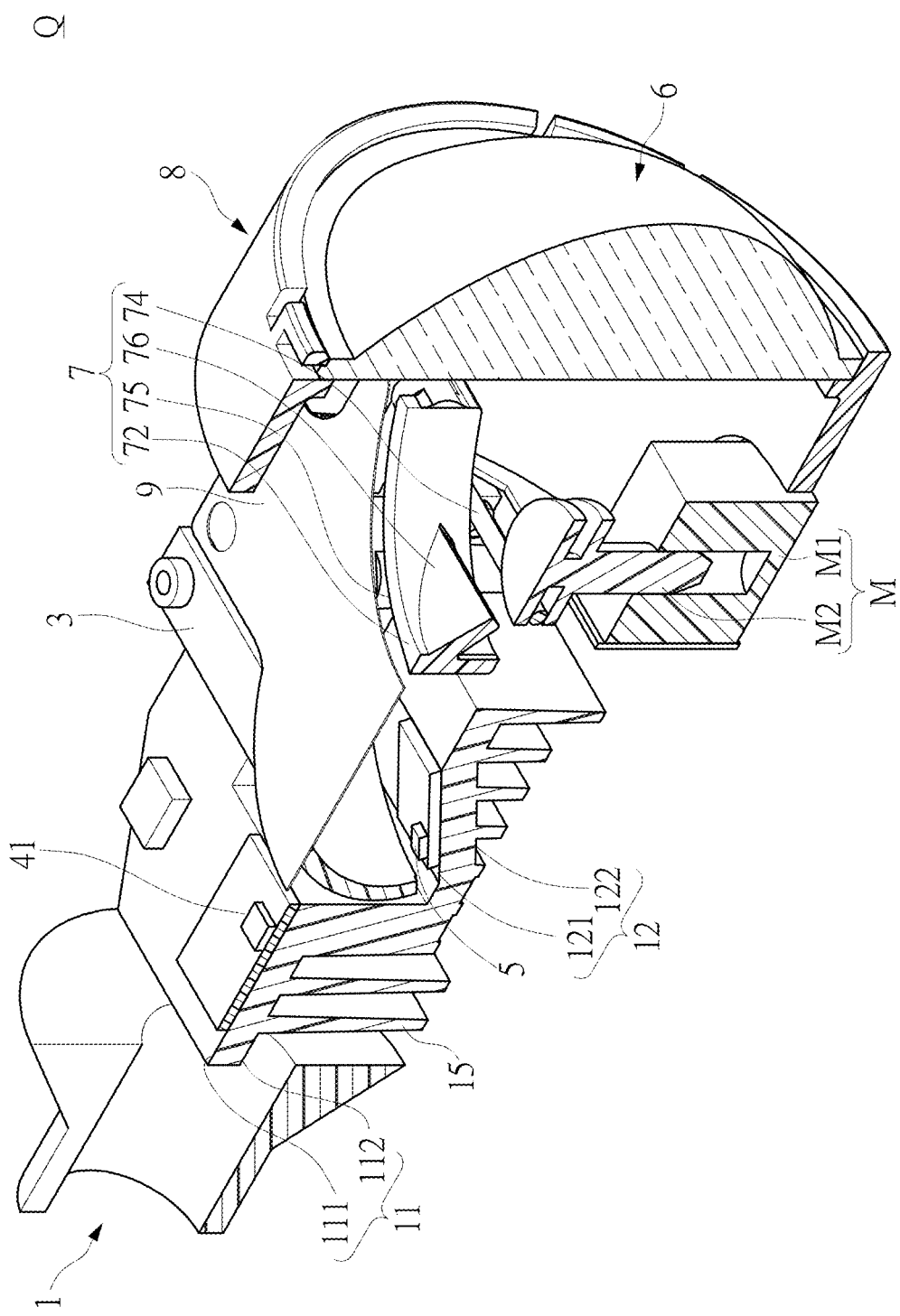
FIG. 23 is a cross-sectional view along the section line XXIV-XXIV in FIG. 19 according to the one embodiment of the present disclosure.
Figure 24:
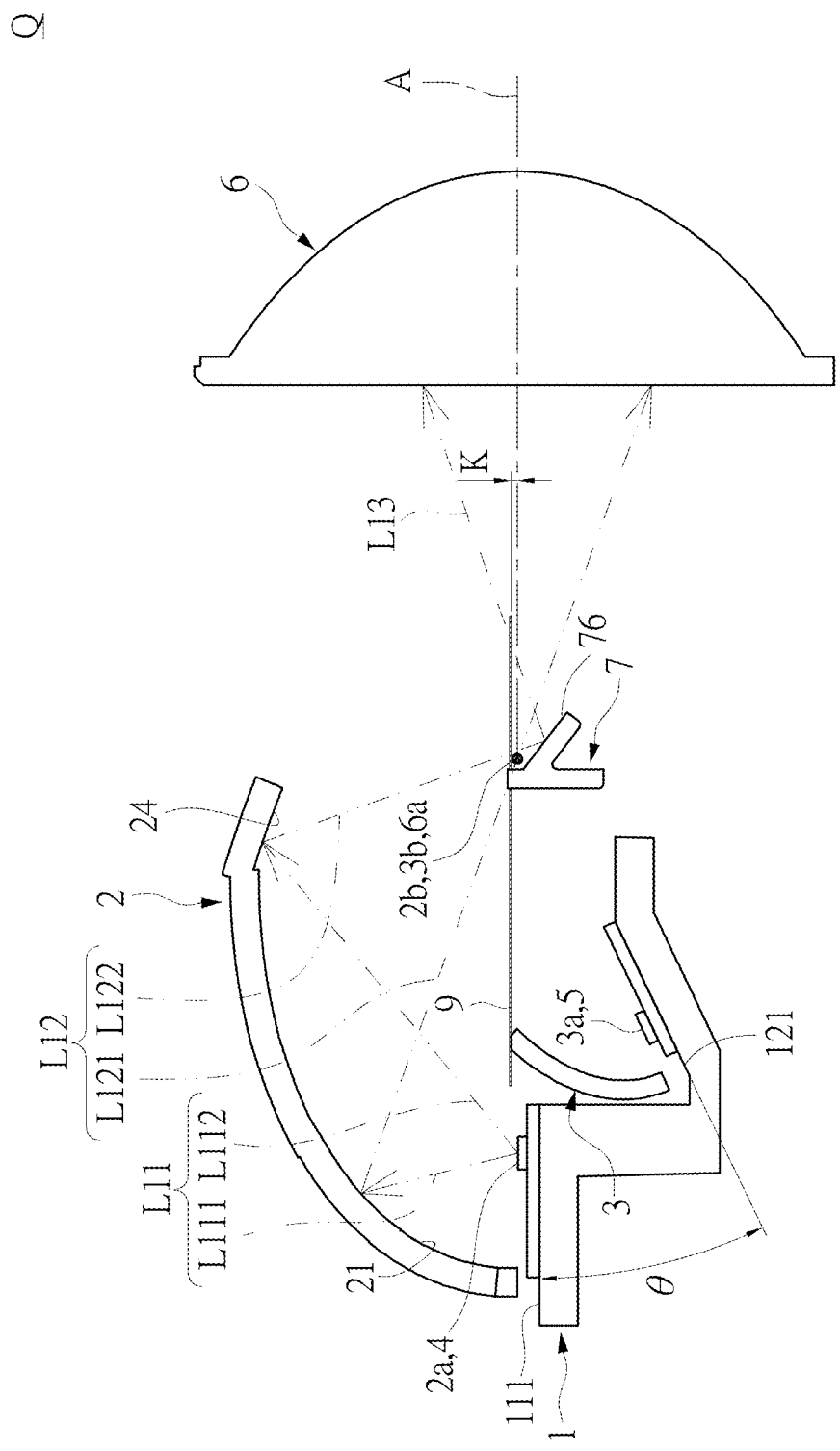
FIG. 24 is a side sectional view along the section line XXIV-XXIV in FIG. 19 according to the one embodiment of the present disclosure.
Figure 25:
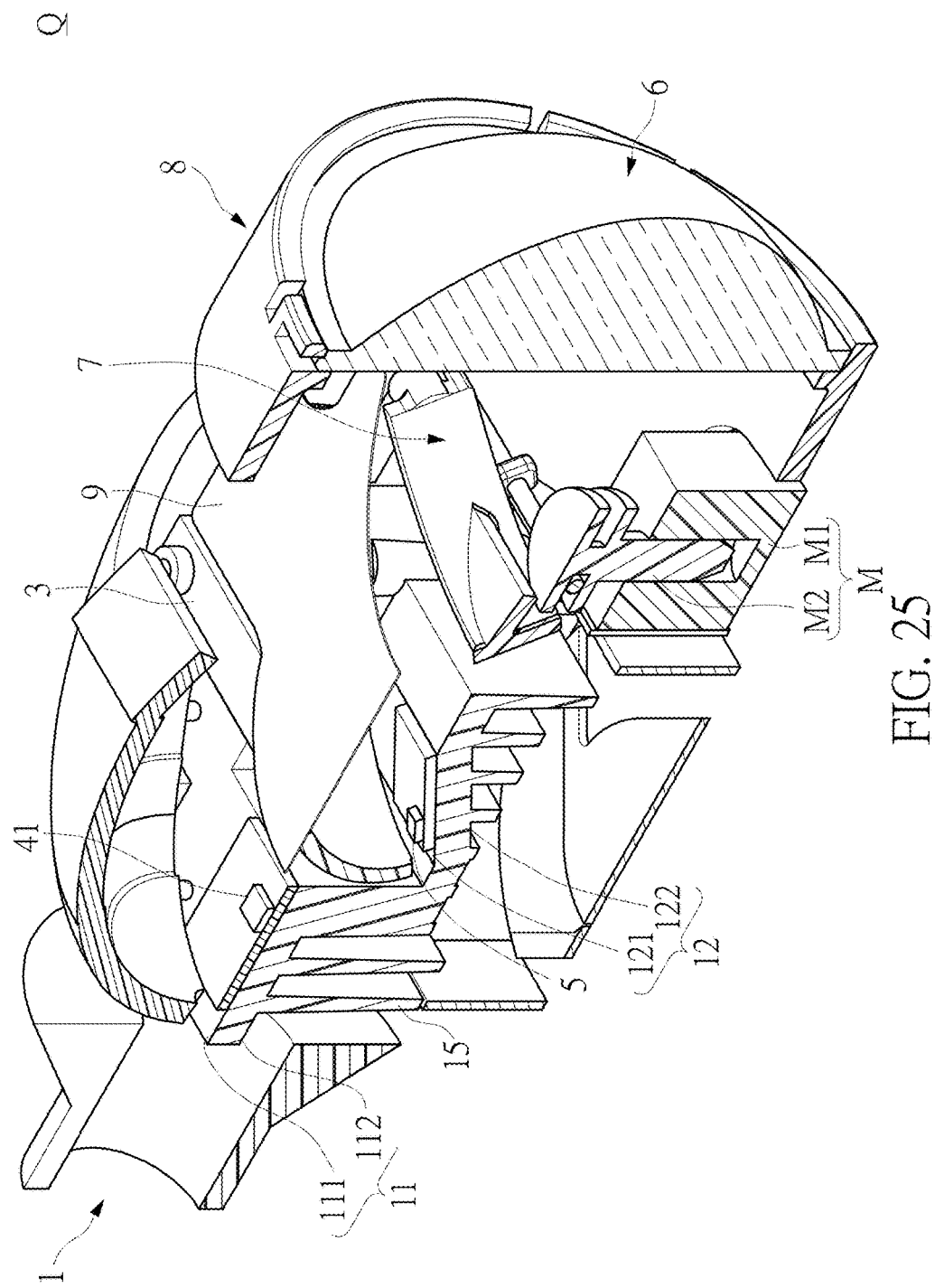
FIG. 25 is a cross-sectional view along the section line XXIV-XXIV in FIG. 19 according to another embodiment of the present disclosure.
Figure 26:
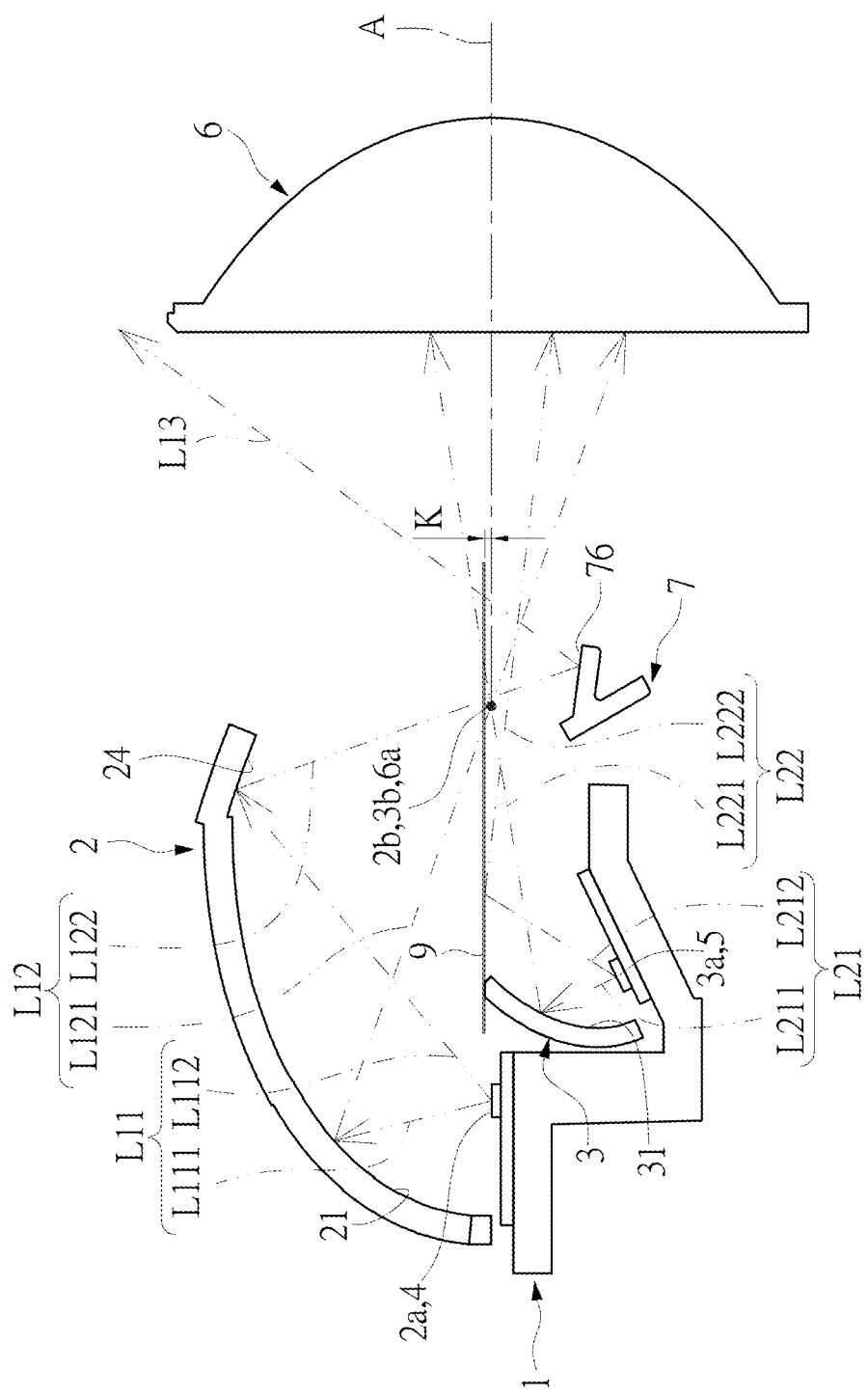
FIG. 26 is a side sectional view along the section line XXIV-XXIV in FIG. 19 according to another embodiment of the present disclosure.

Next, referring to FIG. 19 and FIG. 24 in conjunction with FIG. 25 and FIG. 26, FIG. 25 and FIG. 26 illustrate the position of the shielding structure 7 of the vehicle lamp Q under the high beam mode. In the second embodiment, the shielding structure 7 further includes a reflection part 76, and the first reflection structure 2 further includes a reflection board 24. A first light L1 generated from the first emitting structure 4 can include at least one first projection light L11 projected on the first reflection structure 2, one part of the first projection light L111 can be projected on the first reflection surface 21 of the first reflection structure 2, and another part of the first projection light L112 can be projected on the reflection board 24 of the first reflection structure 2. One part of the first projection light L111 is reflected by the first reflection surface 21 of the first reflection structure 2, so as to form a part of the first projection light L121 passing through the second focal point 2b of the first reflection structure 2. Another part of the first projection light L112 is reflected by the reflection board 24 of the first reflection structure 2, so as to form another part of the first projection light L122 projecting onto the reflection part 76 of the shielding structure 7. Another part of the first projection light L122 is reflected by the reflection part 76 of the shielding structure 7, so as to form a first incident light L13 projecting on the lens structure 6. Accordingly, the first incident light L13 is projected toward an upward direction above a horizontal plane through the configuration of the reflection part 76 and the reflection board 24. In other words, the illuminance of residual light area in dark zone is provided by the first incident light L13.

Next, referring to FIG. 25 and FIG. 26, the function of the light beam modulator 9 is further described as follows. The light beam modulator 9 is disposed between the first reflection structure 2 and the second reflection structure 3. For example, the light beam modulator 9 is disposed on the base 1 through the lens carrier structure 8 or directly disposed on the base 1. Meanwhile, the light beam modulator 9 can be integrally formed with the second reflection structure 3 or can be directly disposed on the second reflection structure 3, but the example is not meant to limit the scope of the present disclosure. More particularly, the light beam modulator 9 can be formed above the lens optical axis A (that is, the lens optical axis A is located between the light beam modulator 9 and the second reflection structure 3), and a predetermined distance K ranging from of 0 mm to about 2 mm is formed between the light beam modulator 9 and the lens optical axis A (that is, the distance between the second outer surface 92 of the light beam modulator 9 and the lens optical axis A).

As described above, referring to FIG. 26, the second light emitting structure 5 generates a second projection light L21 when the high beam is lit and the shielding structure 7 is located at the position of the high beam mode. Then, the second projection light L21 is reflected by the second reflection structure 3 and the light beam modulator 9 so as to form a second reflection light L22. One part of the second projection light L211 can be projected on the second reflection structure 3, and another part of the second projection light L212 can be projected on the light beam modulator 9. One part of the second projection light L211 is reflected by the second reflection surface 31 so as to form a part of the second reflection light L221 which passes through the second focal point 3b of the second reflection structure 3. Another part of the second projection light L212 is reflected by the second outer surface 92 of the light beam modulator 9 so as to form a part of the second reflection light L222.

Accordingly, the disposition of the light beam modulator 9 can prevent the situation of the aforementioned embodiment that the second projection light L21 generated by the second light emitting structure 5 is reflected by the reflection surfaces (i.e. the first reflection surface 21, the second reflection surface 22, and the third reflection surface 23) of the first reflection structure 2 (the situation is not shown in figures) and forming stray light of the dark zone. Meanwhile, the disposition of the light beam modulator 9 further increases the light intensity of the central point at the light pattern of projection.

Figure 27:
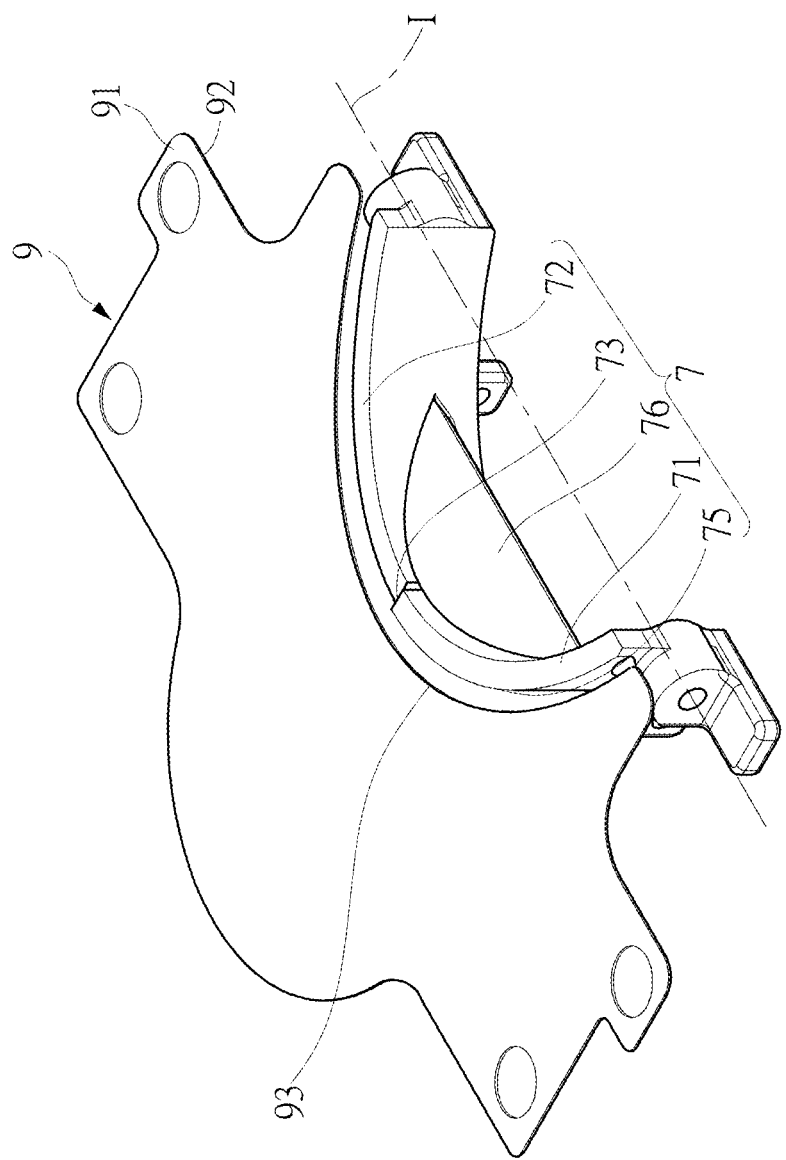
FIG. 27 is a perspective view of the light beam modulator and the shielding structure according to one embodiment of the present disclosure.
Figure 28:
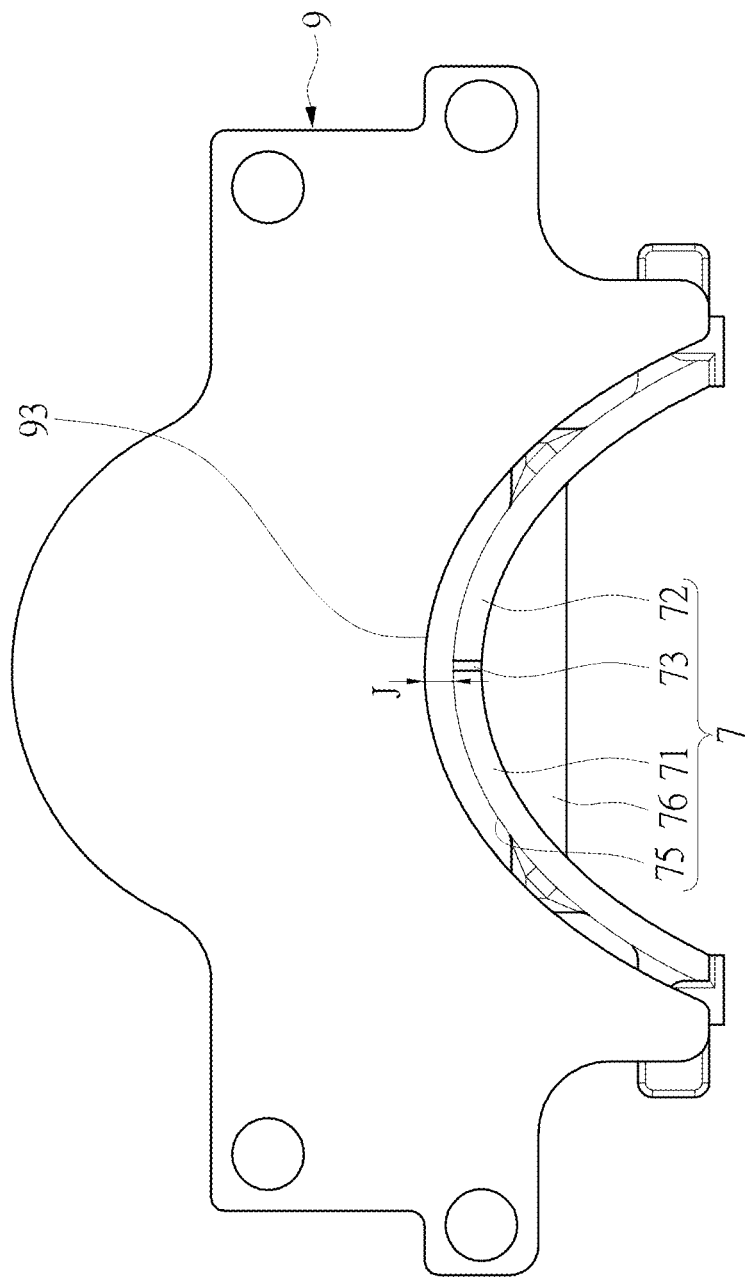
FIG. 28 is a top view of the light beam modulator and the shielding structure according to one embodiment of the present disclosure.
Figure 29:
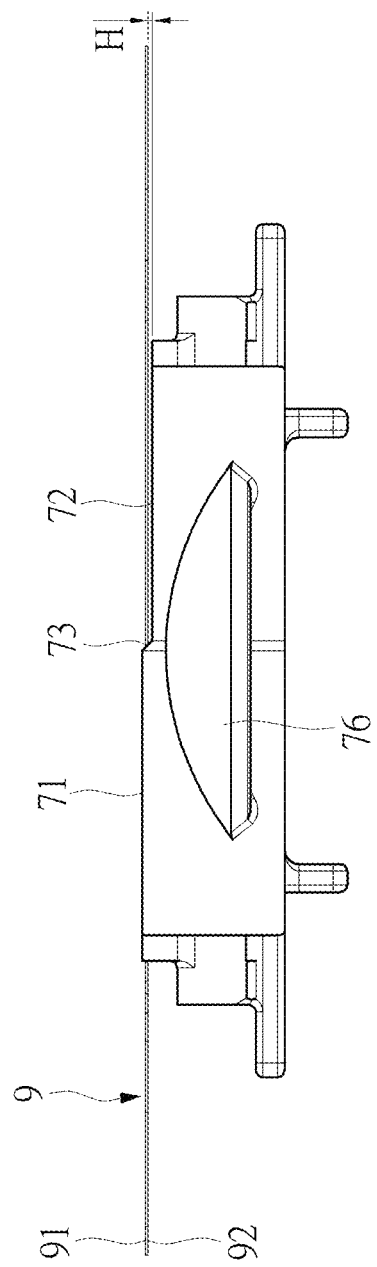
FIG. 29 is a front view of the light beam modulator and the shielding structure according to one embodiment of the present disclosure.

Next, referring to FIG. 27 and FIG. 28, the correlation between light beam modulator 9 and the shielding structure 7 is further described as follows. The light beam modulator 9 can have a first outer surface 91 and a second outer surface 92 corresponding to the first outer surface 91. The thickness of the light beam modulator 9 (i.e. the distance between the first outer surface 91 and the second outer surface 92) can be in a range of about 0.1 mm to about 1.5 mm, preferably be in a range of about 0.2 mm to about 0.3 mm. The light beam modulator 9 further includes an end edge 93 disposed along an outline 75 of an outer edge of the shielding structure 7. For example, the profile formed by the end edge 93 of the light beam modulator 9 is similar to the profile formed by the outline 75 of the outer edge of the shielding structure 7. For example, both of the profiles formed by the end edge 93 and the outline 75 of the outer edge are a shape of "U" type. Furthermore, the end edge 93 can contact the outline 75 of the outer edge or a predetermined gap J formed between the end edge 93 and the outline 75 of the outer edge can be in range of about 0.1 mm to about 6 mm; preferably, the distance between the end edge 93 and the outline 75 of the outer edge is as closer as possible. Furthermore, referring to FIG. 29, it should be noted that a predetermined stage difference H existing between the second outer surface 92 of the light beam modulator 9 and the second surface 72 of the shielding structure 7 is in a range of about 0.1 mm to about 1.5 mm. In other words, the light beam modulator 9 can be disposed between the first surface 71 and the second surface 72 of the shielding structure 7 as shown in FIG. 29. Meanwhile, the light intensity around the 75R position is further increased by the disposition of the predetermined stage difference H.

Figure 30:
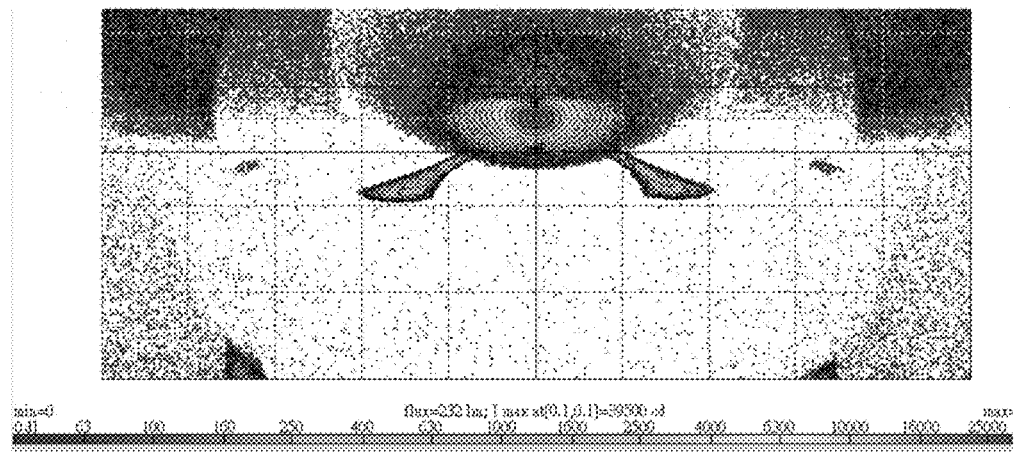
FIG. 30 is a schematic view showing the projection of the light pattern generated from the second reflection structure of the vehicle lamp without the light beam modulator according to the present disclosure.
Figure 31:
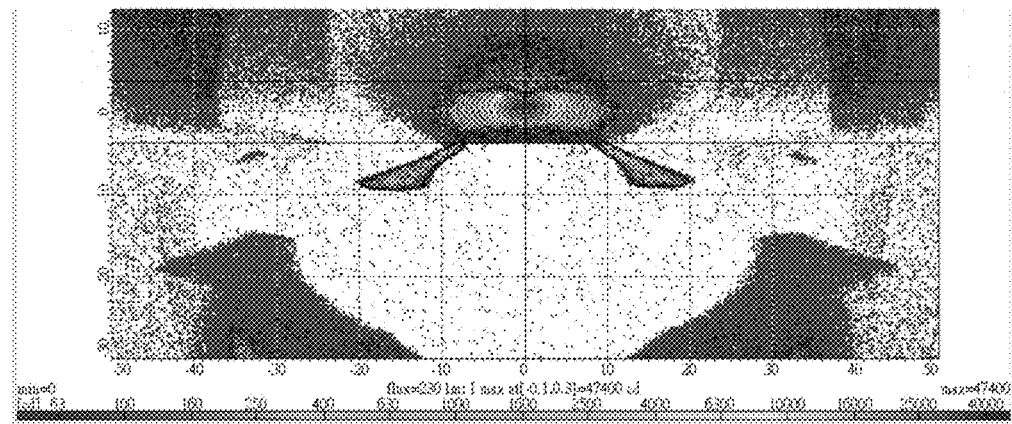
FIG. 31 is a schematic view showing one projection of the light pattern generated from the second reflection structure of the vehicle lamp with the light beam modulator according to the present disclosure.

Next, referring to FIG. 30 and FIG. 31, FIG. 30 is a schematic view showing the projection of the light pattern generated from the second reflection structure 3 of the vehicle lamp without the light beam modulator according to the present disclosure; and FIG. 31 is a schematic view showing one projection of the light pattern generated from the second reflection structure of the vehicle lamp with the light beam modulator according to the present disclosure. The difference resulted from the disposition of the light beam modulator 9 is further described as follows. As shown in FIG. 30 and FIG. 31, when the light beam modulator 9 is disposed, the partial light beam projected below the horizontal line HH of the light pattern can be shifted to form a light beam up above the horizontal line HH and adjacent to the horizontal line HH of the light pattern. Accordingly, the light intensity of the zone up above the horizontal line HH and adjacent to the horizontal line HH can be increased.

Figure 32:
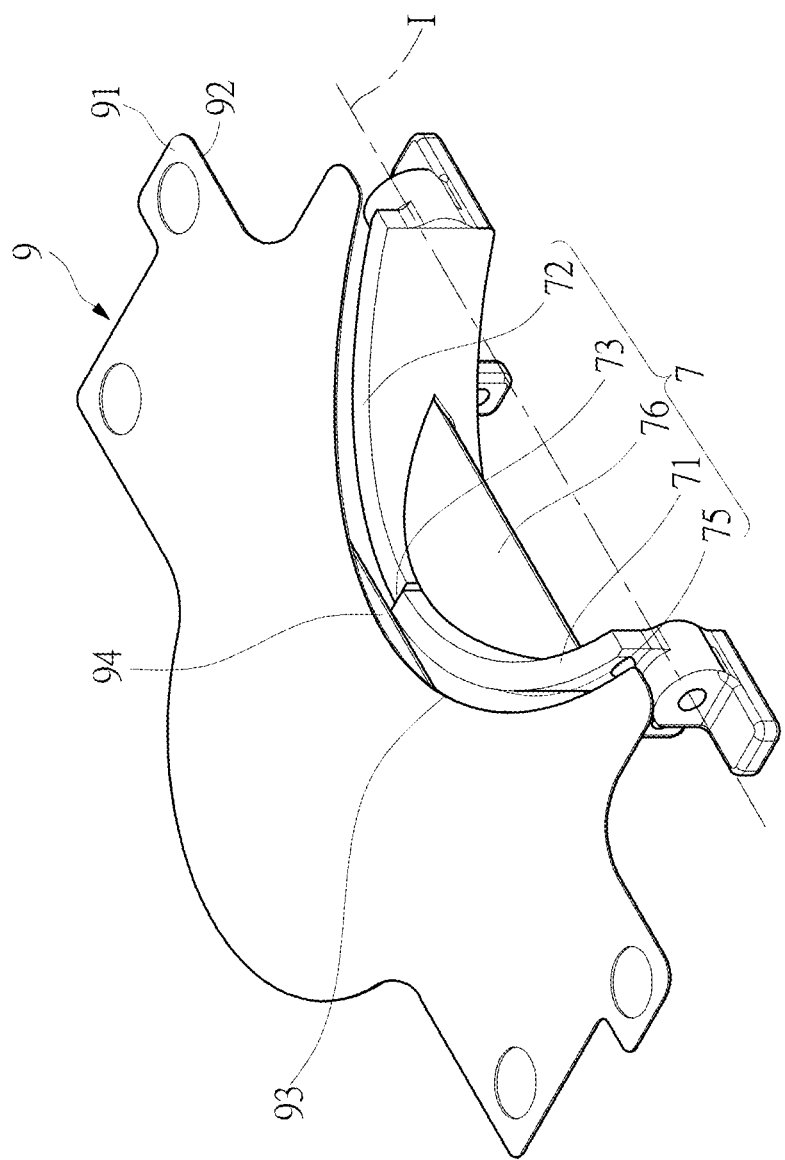
FIG. 32 is a perspective view of the light beam modulator and the shielding structure according to another embodiment of the present disclosure.
Figure 33:
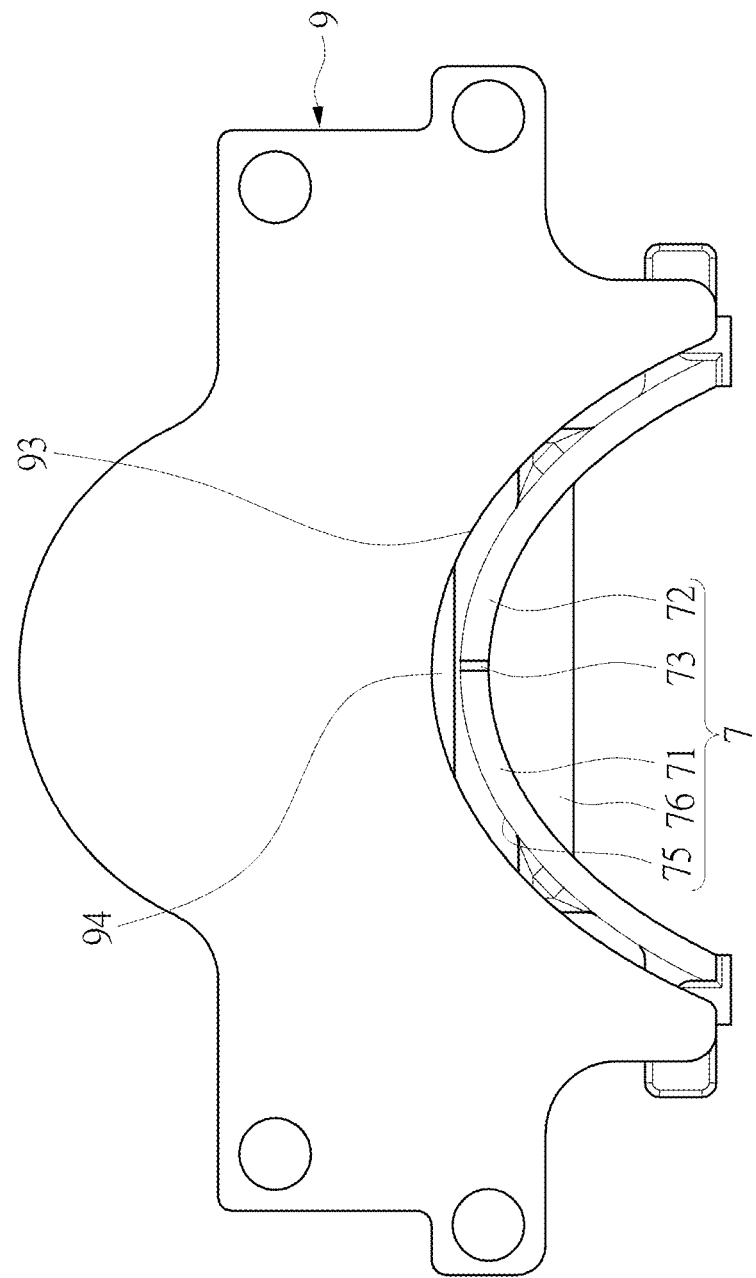
FIG. 33 is a top view of the light beam modulator and the shielding structure according to another embodiment of the present disclosure.
Figure 34:
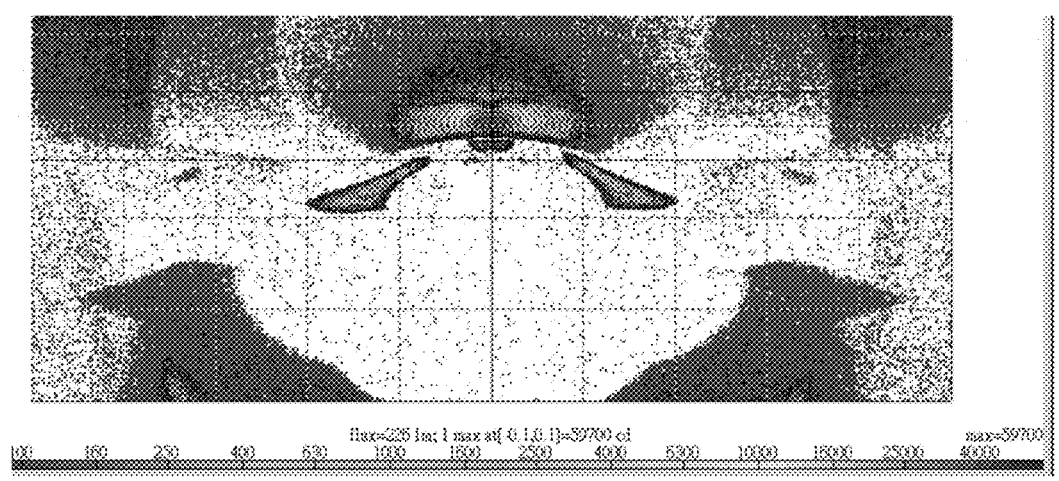
FIG. 34 is a schematic view showing another projection of the light pattern generated from the second reflection structure of the vehicle lamp with the light beam modulator according to the present disclosure.

Next, please refer to FIG. 32 and FIG. 33. Compared to FIG. 32 and FIG. 27, the light beam modulator 9 further includes a side edge 94 protruded from the end edge 93 in the embodiment of FIG. 32. In detail, the side edge 94 can be a sheet with reflection effect such as Al sheet or Al foil, and the side edge 94 can be disposed on the second outer surface 92 of the light beam modulator 9. Preferably, the end of the side edge 94 should not interfere with the rotation of the shielding structure 7 and should as close to the lens focal point 6a as possible. Furthermore, the side edge 94 can be disposed on the second outer surface 92 by sticking, riveting, welding or being integral with the second outer surface 92, but the example is not meant to limit the scope of the present disclosure. More particularly, the thickness of the side edge 94 is smaller than the thickness of the light beam modulator 9 (i.e. the distance between the first outer surface 91 and the second outer surface 92). For example, the thickness of the side edge 94 can be in a range of about 0.05 mm to about 0.2 mm, and preferably is about 0.05 mm. It should be noted that, the profile of the side edge 94 is substantially similar to the profile of the end edge 93 of the light beam modulator 9 since the side edge 94 is protruded merely in a small portion. Next, referring to FIG. 34 in conjunction with FIG. 31, the light can be further shifted upward after the side edge 94 is disposed on the light beam modulator 9. Therefore, the light intensity of the zone of the horizontal axis HH is further increased.

In conclusion, the overall volume of the vehicle lamp Q can be reduced and the efficiency of light concentration can be increased by matching the feature of "both of the first carrier surface 111 and the second carrier surface 121 face toward an upward direction above a horizontal plane" of the vehicle lamp of the present disclosure. Furthermore, the efficiency of light concentration can be further increased by matching the feature of "the first carrier surface 111 and the second carrier surface 121 is tilted relative to each other" and "the first carrier surface 111 and the second carrier surface 121 face toward a upward direction above a horizontal plane". Furthermore, the heat dissipation efficiency of the vehicle lamp Q is enhanced by a plurality of heat dissipation structures 15 disposed on the base 1.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A vehicle lamp, comprising:
   a base having a first carrier surface and a second carrier surface;
   a first reflection structure disposed on the base, and the first reflection structure including at least one first focal point and at least one second focal point;
   a second reflection structure disposed on the base, and the second reflection structure including a first focal point and a second focal point, wherein the second focal point of the second reflection structure and the second focal point of the first reflection structure are disposed corresponding to each other;
   a first light emitting structure disposed on the first carrier surface of the base, and the first light emitting structure corresponding to the at least one first focal point of the first reflection structure;
   a second light emitting structure disposed on the second carrier surface of the base, and the second light emitting structure corresponding to the first focal point of the second reflection structure; and
   a lens structure having a lens optical axis and a lens focal point located on the lens optical axis, wherein the at least one second focal point of the first reflection structure and the second focal point of the second reflection structure are located on the lens optical axis or adjacent to the lens optical axis;
   wherein both of the first carrier surface and the second carrier surface face toward an upward direction above a horizontal plane.

2. The vehicle lamp of claim 1, wherein the base further includes a container, the second reflection structure is disposed in the container, and a predetermined gap is formed between a top portion of the second reflection structure and the lens optical axis is in a range of about 0 mm to about 5 mm.

3. The vehicle lamp of claim 1, wherein the base further includes a plurality of heat dissipation structures disposed on a first heat dissipation surface corresponding to the first carrier surface or a second heat dissipation surface corresponding to the second carrier surface, and the heat dissipation structures extend toward a direction away from the first carrier surface.

4. The vehicle lamp of claim 1, further comprising: a fan structure disposed on the base.

5. The vehicle lamp of claim 1, further comprising: a lens-carrier structure disposed on the base, and the lens structure disposed on the lens-carrier structure.

6. The vehicle lamp of claim 1, further comprising: a shielding structure disposed on the base and disposed between the first reflection structure and the second reflection structure, wherein the shielding structure has a first surface, a second surface corresponding to the first surface, and a cut-off edge connecting the first surface and the second surface.

7. The vehicle lamp of claim 6, further comprising: a light beam modulator disposed between the first reflection structure and the second reflection structure, wherein the second light emitting structure generates a second projection light, one part of the second projection light is projected onto the second reflection structure, and another part of the second projection light is projected onto the light beam modulator.

8. The vehicle lamp of claim 7, wherein the light beam modulator has an end edge disposed along an outline of an outer edge of the shielding structure.

9. The vehicle lamp of claim 8, wherein the light beam modulator further includes a side edge protruded from the end edge.

10. The vehicle lamp of claim 1, wherein a first light generated from the first light emitting structure is projected onto the lens structure to form a first illuminated area.

11. The vehicle lamp of claim 1, wherein the size of the second reflection structure is smaller than the size of the first reflection structure.

12. The vehicle lamp of claim 1, wherein a first light generated from the first light emitting structure includes a first projection light projected onto the first reflection structure, a second light generated from the second light emitting structure includes a second projection light projected onto the second reflection structure, and a part of the first projection light and a part of the second projection light are projected toward a predetermined direction.

13. The vehicle lamp of claim 1, wherein the first reflection structure includes a first reflection surface which has a first optical axis and a second optical axis, and the first light emitting structure includes a first light emitting element and a second light emitting element; wherein the first optical axis of the first reflection surface passes through the first light emitting element, and the second optical of the first reflection surface passes through the second light emitting element.

14. The vehicle lamp of claim 13, wherein the first reflection surface of the first reflection structure has two first focal points separated from each other and two second focal points corresponding respectively to the two first focal points, the first light emitting element is disposed on one of the first focal points, the second light emitting element is disposed on the other first focal point, the two second focal points are overlapped with each other, and the lens optical axis passes through the two second focal points of the first reflection surface of the first reflection structure.

15. The vehicle lamp of claim 14, wherein the first reflection structure further includes a second reflection surface connecting the first reflection surface, the second reflection surface has an optical axis located between the first light emitting surface and the second light emitting surface.

16. The vehicle lamp of claim 1, wherein a predetermined angle formed between the first carrier surface and the second carrier surface is in a range of 0° to about 35°.

17. The vehicle lamp of claim 1, wherein the first focal point of the second reflection structure is located between the lens focal point and the at least one first focal point of the first reflection structure.

18. A vehicle lamp, comprising:
a reflection structure having a first reflection surface and a second reflection surface connecting with the first reflection surface, wherein the first reflection surface has a first optical axis and a second optical axis, and the second reflection surface has an optical axis;
a light emitting structure having a first light emitting element and a second light emitting structure, wherein the first optical axis passes through the first light emitting element, the second optical axis passes through the second light emitting element, and the optical axis of the second reflection surface is located between the first light emitting element and the second light emitting element; and
a lens structure having a lens optical axis and a lens focal point located on the lens optical axis;
wherein the first reflection surface of the first reflection structure has two first focal points separated from each other and two second focal points corresponding respectively to the two first focal points, the first light emitting element is disposed on one of the first focal points, the second light emitting element is disposed on the other first focal point, the two second focal points are overlapped with each other, and the lens optical axis passes through the two second focal points of the first reflection surface of the first reflection structure; and
wherein the first reflection surface and the second reflection surface are arranged along an extension of the lens optical axis.

19. A vehicle lamp, comprising:
a base having a first carrier surface, a second carrier surface, a first heat dissipation surface corresponding to the first carrier surface, a second heat dissipation surface corresponding to the second carrier surface, and an outer side surface connecting the first heat dissipation surface and the second heat dissipation surface, wherein the first carrier surface and the second carrier surface are disposed on the different planes, and both of the first carrier surface and the second carrier surface face toward a predetermined direction;
a first reflection structure disposed on the base, and the first reflection structure including at least one first focal point and at least one second focal point;
a second reflection structure disposed on the base, and the second reflection structure including a first focal point and a second focal point, wherein the second focal point of the second reflection structure and the second focal point of the first reflection structure are disposed corresponding to each other;
a first light emitting structure disposed on the first carrier surface, and the first light emitting structure corresponding to the at least one first focal point of the first reflection structure;
a second light emitting structure disposed on the second carrier surface of the base, and the second light emitting structure corresponding to the first focal point of the second reflection structure;
a lens structure having a lens optical axis and a lens focal point located on the lens optical axis, wherein the at least one second focal point of the first reflection structure and the second focal point of the second reflection structure are located on the lens optical axis or adjacent to the lens optical axis; and
a fan structure disposed on the base, wherein the fan structure generates a first airflow blowing to the second heat dissipation surface, the first airflow flows along the second heat dissipation surface and reaches the outer side surface to generate a second airflow, the second airflow flows along the outer side surface and blows to the first heat dissipation surface to generate a third airflow, and the third airflow flows along the first heat dissipation surface and blows toward outside the first heat dissipation surface.

* * * * *